(12) United States Patent
Iseki et al.

(10) Patent No.: US 8,905,466 B2
(45) Date of Patent: Dec. 9, 2014

(54) STRUCTURE FOR FRONT OF VEHICLE BODY

(75) Inventors: Masashige Iseki, Wako (JP); Kosaku Tomozawa, Wako (JP); Manabu Ishizono, Wako (JP); Takeshi Yoshimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/981,402

(22) PCT Filed: Jan. 20, 2012

(86) PCT No.: PCT/JP2012/051169
§ 371 (c)(1),
(2), (4) Date: Sep. 5, 2013

(87) PCT Pub. No.: WO2012/102192
PCT Pub. Date: Aug. 2, 2012

(65) Prior Publication Data
US 2013/0334840 A1 Dec. 19, 2013

(30) Foreign Application Priority Data

Jan. 26, 2011 (JP) ................................. 2011-014097
Jan. 26, 2011 (JP) ................................. 2011-014121

(51) Int. Cl.
*B62D 25/08* (2006.01)
*B62D 25/20* (2006.01)
*B62D 21/11* (2006.01)

(52) U.S. Cl.
CPC ................ *B62D 25/08* (2013.01); *B62D 21/11* (2013.01); *B62D 25/082* (2013.01); *B62D 25/2018* (2013.01)

USPC .................. 296/203.02; 296/204; 296/30

(58) Field of Classification Search
CPC .. B62D 21/11; B62D 25/108; B62D 25/2018; B62D 25/082
USPC .................. 296/204, 203.01, 203.02, 187.09, 296/193.09, 209, 29, 30
See application file for complete search history.

(56) References Cited

U.S. PATENT DOCUMENTS

| 5,466,033 A | * | 11/1995 | Murakami et al. | 296/203.02 |
| 7,469,957 B1 | * | 12/2008 | Boettcher | 296/193.07 |
| 2009/0243336 A1 | * | 10/2009 | Honji et al. | 296/187.09 |
| 2010/0032989 A1 | * | 2/2010 | Ohara | 296/204 |

FOREIGN PATENT DOCUMENTS

| JP | 2003-063454 | 3/2003 |
| JP | 2005-219610 | 8/2005 |
| JP | 2006-290311 | 10/2006 |
| JP | 2008-201392 | 9/2008 |
| JP | 2009-234495 | 10/2009 |
| WO | 2009/008426 | 1/2009 |

* cited by examiner

*Primary Examiner* — Dennis H Pedder
(74) *Attorney, Agent, or Firm* — Rankin, Hill & Clark LLP

(57) ABSTRACT

A vehicle body includes left and right side front frames extending towards the back of the vehicle body while curving from the outside in the width direction of the vehicle to the inside in the width direction of the vehicle. The left and right front side frames branch off from the ends thereof into left and right side sill-side extensions extending to the back towards the outside in the width direction of the vehicle, and left and right tunnel-side extensions extending to the back towards the inside in the width direction of the vehicle. Left and right reinforcing members are provided to the inside of curved parts on the left and right side and extend in the front-to-back direction of the vehicle body in the left and right side.

19 Claims, 21 Drawing Sheets

STRUCTURE FOR FRONT OF VEHICLE BODY

TECHNICAL FIELD

The present invention relates to structures for a front of a vehicle body, i.e. front vehicle body structures, improved to efficiently transmit collision force from left and right front side frames, located in a front section of the vehicle body, toward the rear of the vehicle body.

BACKGROUND ART

In a front section of a vehicle body are provided left and right front side frames, left and right sills and a central tunnel section that are among principal components of the vehicle body. At the time of occurrence of a so-called frontal collision, where collision force acts on the front surface of the vehicle, the collision force transmits via the left and right front side frames to the left and right sills and the central tunnel section and then disperse to a rear section of the vehicle body. Technique related to the left and right front side frames are known from Patent Literature 1 and Patent Literature 2.

In the vehicle body disclosed in Patent Literature 1, a vehicle-traveling power unit (comprising an engine and a transmission) is disposed between front half portions of the left and right front side frames, and left and right front wheels are disposed laterally outward, in a vehicle width direction, of rear portions of the left and right front side frames. Particularly, if an engine room having a space short in a front-rear direction the vehicle body is employed in the vehicle body, the vehicle-traveling power unit is mounted in the engine room in such a manner as to be elongated in the vehicle width direction. In such a case, for example, a so-called transverse-mounted engine having a crankshaft oriented in the vehicle width direction is employed as the engine. Further, in the vehicle body disclosed in Patent Literature 1, rear half portions of the left and right front side frames are curved inwardly in such a manner as to gradually approach each other in a direction toward the rear of the vehicle body, in order to widen steerable ranges of the left and right front wheels. Thus, the curved rear half portions of the left and right front side frames can have an increased strength.

Further, the vehicle body disclosed in Patent Literature 2 is constructed to suppress occurrence of rapid bending of the left and right front side frames against collision force acting from the front of the vehicle body.

In recent years, there has been an increasing demand for a technique for efficiently dispersing collision force from the front of the vehicle body throughout the entire vehicle body.

PRIOR ART LITERATURE

Patent Literature 1: Japanese Patent Application Laid-Open Publication No. 2006-290311
Patent Literature 2: Japanese Patent Application Laid-Open Publication No. 2009-234495

SUMMARY OF INVENTION

Technical Problem

It is therefore an object of the present invention to provide a technique capable of efficiently transmitting collision force, having acted on the front surface of the vehicle to a rear section of the vehicle body for effective dispersion throughout the collision force.

Solution to Problem

According to the invention of claim 1, there is provided a front vehicle body structure, which comprises: a front vehicle body structure comprising: left and right front side frames disposed on left and right sides of a front section of the vehicle body and extending in a front rear direction of the vehicle body; a lower dashboard panel disposed behind the left and right front side frames and partitioning the vehicle body into front and rear sections; a floor panel extending rearward from a lower portion of the lower dashboard panel; a tunnel section disposed on a middle region, in a vehicle width direction, of the floor panel and extending in the front-rear direction of the vehicle body; and left and right side sills disposed on opposite sides, in the vehicle width direction, of the floor panel and extending in the front-rear direction of the vehicle body, characterized in that the left and right front side frames are each formed in a closed sectional shape and have, in rear half portions thereof, left and right curved sections, respectively, extending rearward while curving from outside to inside in the vehicle width direction, in that left and right reinforcing members are provided within the left and right curved sections, respectively, each of the left and right reinforcing members extending straight in the front-rear direction of the vehicle body from a portion, in front of the left or right curved section, of an inner wall located inward in the vehicle width direction, of the left or right front side frame to a portion, behind the left or right curved section, of an outer wall, located outward in the vehicle width direction, of the left or right front side frame, in that the front vehicle body structure further comprises: left and right side-sill-side extensions bent rearward and outward in the vehicle width direction from rear ends of the left and right front side frames, respectively, continuously with the closed sections of the left and right front side frames, the left and right side-sill-side extensions being bent from the rear ends of the left and right front side frames rearwardly and outwardly in the vehicle width direction to slantingly extend rearward and outward in the vehicle width direction to be joined the left and right side sills, respectively; and, left and right tunnel-side sections branching from inner walls, located inward in the vehicle width direction, of the bent portions of the left and, right side-sill-side extensions and slantingly extending rearward and inward in the vehicle width direction to be joined to the tunnel section, and in that an angle at which each of the left and right tunnel-side extensions slants inward in the vehicle width direction is set substantially equal to an angle at which each of the left and right side-sill-side extensions slants outward in the vehicle width direction.

Preferably, as recited in claim 2, the front vehicle body structure of the present invention further comprises left and right outriggers that extend outward in the vehicle width direction from outer walls, located outward in the vehicle width direction, of front end portions of the left and right side-sill-side extensions, respectively, and that are joined to the left and right side sills, respectively.

Preferably, as recited in claim 3, the left and right reinforcing members include left and right bulkheads, respectively, each of the left and right bulkheads partitioning the interior of the left or right curved section into front and rear portions, and the left and right bulkheads have left and right nut members, respectively, for supporting a vehicle-traveling power unit disposed between the left and right front side frames.

Preferably, as recited in claim 4, a rear section of each of the left and right front side frames is constructed as a bent structure where the rear section is bent rearward and downward along the underside of the lower dashboard panel with a rear lower end portion of the rear section bent rearward, the left and right stiffeners are provided in the bent rear sections of the left and right front side frames, respectively, and the front end of each of the left and right stiffeners is located relative to the rear end of a corresponding one of the left and right reinforcing members in such a manner that a load applied in the front-rear direction of the vehicle body can be transmitted between the front end of the stiffener and the rear end of the reinforcing member.

Preferably, as recited in claim 5, each of the left and right reinforcing members is formed in a U sectional shape, and a bead is formed on a bottom wall, defining a bottom of the U section, of each of the left and right reinforcing members.

Preferably, as recited in claim 6, the tunnel section includes: a center tunnel protruding upward from a central part, in the vehicle width direction, of the floor panel and extending in the front rear direction of the vehicle body; left and right tunnel frames provided on opposite sides, in the vehicle width direction, of the center tunnel; and a tunnel cross member connecting at least either between the front ends of the left and right tunnel frames or between the rear ends of the left and right tunnel-side extensions.

Preferably, as recited in claim 7, the inner walls, located inward in the vehicle width direction, of the left and right curved sections have left and right fragile portions, respectively, and the left and right fragile portions are more fragile than other portions of the left and right front side frames. The left and right fragile portions are located more rearward, in the front rear direction of the vehicle body, than the left and right bulkheads.

Preferably, as recited in claim 8, the left and right fragile portions are in the form of left and right recessed portions each dented from the inner wall of the left or right curved section toward the interior of the closed section of the left or right curved section, and the left and right recessed portions are each located in a portion of the left or right curved section having a smaller width than other portions of the left or right curved section.

Preferably, as recited in claim 9, the left and right reinforcing members are each formed in a U sectional shape and each have a partly-omitted sectional portion with a part of the U sectional shape taken away. The left and right fragile portions are disposed in opposed relation to the partly-omitted sectional portions of the left and right reinforcing members.

Advantageous Effects of Invention

In the invention recited in claim 1, although longitudinally middle parts of the left and right front side frames extend toward the rear of the vehicle body while curving from outside to inside in the vehicle width direction, the left and right reinforcing members are provided within the left and right curved sections. The left and right reinforcing members each extend substantially straight in the front-rear direction of the vehicle body from a portion, in front of the left or right curved section, of the inner wall of the left or right front side frame to a portion, behind the left or right curved section, of the outer wall of the left or right front side frame.

Thus, when a frontal collision of the vehicle has occurred, collision force from the front of the vehicle body (frontal collision force) transmits from the front ends of the left and right front side frames to the rear ends of the left and right front side frames by way of the left and right curved sections. At that time, the collision force applied from the front of the vehicle body also transmits from portions, in front of the left and right curved sections, of the inner walls to portions, behind the left and right curved sections, of the outer walls of the left and right front side frames via the substantially straight left and right reinforcing members. Namely, the collision force from the front of the vehicle body can be efficiently transmitted from the front ends to the rear ends of the left and right front side frames via the substantially straight left and right reinforcing members extending in the front-rear direction through the curved sections.

Further, because the rear half portions of the left and right front side frames extend toward the rear of the vehicle body while curving from outside to inside in the vehicle width direction, a space between the front half portions of the left and right front side frames is greater in width than a space between the rear half portions of the left and right front side frames. Thus, even where the overall length of each of the left and right front side frames is short, the vehicle-traveling power unit (comprising, for example, a transverse-mounted engine and a transmission) can be disposed in a laterally-long orientation in the greater space between the front half portions of the left and right front side frames. Further, if left and right front wheels are disposed outward, in the vehicle width direction, of the rear half portions of the left and right front side frames that define the smaller space therebetween, respective steerable ranges of the left and right front wheels can be increased.

Further, in the invention of claim 1, because the left side-sill-side extension and left tunnel-side extension and the right side-sill-side extension and right tunnel-side extension branch in the vehicle width direction from the respective bent section, extending integrally from the rear ends of the left and right front side frames, at equal or substantially equal angles with respect to the bent sections. Thus, collision force applied from the front of the vehicle body can be efficiently dispersed by being transmitted from the rear ends of the left and right front side frames to the curved sections to not only the left and right side-sill-side extensions but also the left and right tunnel-side extensions.

In the invention of claim 2, each of the left and right outriggers extends from a portion of the bent section of the left or right side-sill-side extension opposite from a portion of the bent section of the left or right side-sill-side extension from which the left or right tunnel-side extension branches. The left and right outriggers extend outward in the vehicle width direction from the outer walls of the bent sections and then are joined to the left and right side sills. Thus, when a so-called lateral collision, where collision force acts on a lateral side surface of the vehicle, has occurred, the lateral collision force transmits from one of the left and right side sills to the tunnel section located in the vehicle widthwise middle region of the vehicle body via the outrigger, bent section and tunnel-side extension and then transmits from the tunnel section to the vehicle widthwise middle region. Namely, although the left and right side-sill-side extensions extend to the left and right side sills while greatly slanting from the left and right bent sections rearwardly and outwardly in the vehicle width direction, the lateral collision force can be efficiently dispersed from one of the left and right side sills to the vehicle widthwise middle region.

In the invention of claim 3, the left and right reinforcing members include the left and right bulkheads, respectively, each of which partitions the interior of the left or right curved section into front and rear portions. The left and right bulkheads have the left and right nut members, respectively, for supporting the vehicle-traveling power unit disposed between the left and right front side frames. Thus, when a collision force has transmitted from the front of the vehicle body to the vehicle-traveling power unit, it transmits from the vehicle-traveling power unit to the left and right front side frames by way of the left and right nut members, left and right bulkheads and left and right reinforcing members. In this way, the collision force from the front of the vehicle body can be efficiently transmitted from the vehicle-traveling power unit to the left and right front side frames for effective dispersion.

In the invention of claim 4, the rear section of each of the left and right front side frames is bent along the underside of the lower dashboard panel. Because the thus-bent rear sections of the left and right front side frames are reinforced with the left and right stiffeners provided therein, bending of the bent rear sections due to external force can be suppressed.

Further, in the invention of claim 4, the front ends of the left and right stiffeners are located relative to the rear ends of the left and right reinforcing members, disposed in the sections curved inward in the vehicle width direction, in such a manner as to allow a load, applied in the front-rear direction of the vehicle body, to be transmitted to and from the rear ends of the left and right reinforcing members. Thus, collision force from the front of the vehicle body can be transmitted promptly and efficiently to the left and right stiffeners via the left and right reinforcing members. Thus, although the left and right front side frames curve inward in the vehicle width direction and bend obliquely rearward and downward, collision force from the front of the vehicle body can be efficiently transmitted from the front ends to the rear ends of the left and right front side frames. Thus, the collision force from the front of the vehicle body can be efficiently dispersed from the front ends of the left and right front side frames toward the rear of the vehicle body.

Further, in the invention of claim 5, each of the left and right reinforcing members is formed in a U sectional shape, and the bead is formed on the bottom wall, defining the bottom of the U section, of each of the left and right reinforcing members. Thus, the left and right reinforcing members can have an increased strength and rigidity in the front-rear direction of the vehicle body. Therefore, collision force from the front of the vehicle body can be efficiently dispersed from the front ends of the left and right front side frames to the rear ends of the left and right front side frames.

Further, in the invention of claim 6, the tunnel section includes: the center tunnel protruding upward from the central part, in the vehicle width direction, of the floor panel and extending in the front-rear direction of the vehicle body; the left and right tunnel frames provided the on opposite sides, in the vehicle width direction, of the center tunnel; and the tunnel cross member connecting at least either between the front ends of the left and right tunnel frames or between the rear ends of the left and right tunnel-side extensions. Thus, a load having transmitted from the tunnel-side extension, located on one of the widthwise sides of the vehicle body, to the tunnel section can be dispersed efficiently to the other widthwise side of the vehicle body via the tunnel cross member.

Further, in the invention of claim 7, the inner walls, located inward in the vehicle width direction, of the left and right curved sections of the left and right front side frames have the left and right fragile portions, respectively, and the left and right fragile portions are more fragile than other portions of the left and right front side frames. Besides, the left and right fragile portions are located more rearward, in the front-rear direction of the vehicle body, than the left and right bulkheads each partitioning the interior of the left or right curved section into front and rear portions. The left and right bulkheads have the left and right nut members, respectively, for supporting the vehicle-traveling power unit disposed between the left and right front side frames.

Thus, when collision force has transmitted from the front of the vehicle body to the vehicle-traveling power unit, the collision force transmits from the vehicle-traveling power unit to the left and right front side frames via the left and right nut members and the left and right bulkheads. The left and right fragile portions provided in the inner walls of the left and right front side frames can collapse due to the collision force from the front of the vehicle body, as a consequence of which the left and right front side frames are bent outward in the vehicle width direction. The provision of such left and right fragile portions can achieve an enhanced collision energy absorbing performance of the front section of the vehicle body.

In the invention of claim 8, the left and right fragile portions are in the form of left and right recessed portions each constructed simply by being merely dented from the inner wall of the left or right curved section toward the interior of the closed section of the left or right curved section. The left and right recessed portions are each located in a portion of the left or right curved section having a smaller width than other portions of the left or right curved section. Thus, the left and right fragile portions can promote bending of the left and right front side frames due to collision force from the front of the vehicle body.

In the invention of claim 9, the left and right reinforcing members, formed in a U sectional shape, each have the partly-omitted sectional portion with a part of the U sectional shape taken away or omitted. Thus, the partly-omitted sectional portions have a low strength and low rigidity as compared to other portions of the left and right reinforcing members. The left and right fragile portions are disposed in opposed relation to the partly-omitted sectional portions of the left and right reinforcing members. Thus, bending of the left and right front side frames due to collision force from the front of the vehicle body can be even further promoted.

DESCRIPTION OF EMBODIMENTS

Embodiments of the present invention will be described hereinbelow with reference to the accompanying drawings.

Embodiments

Figure 1:
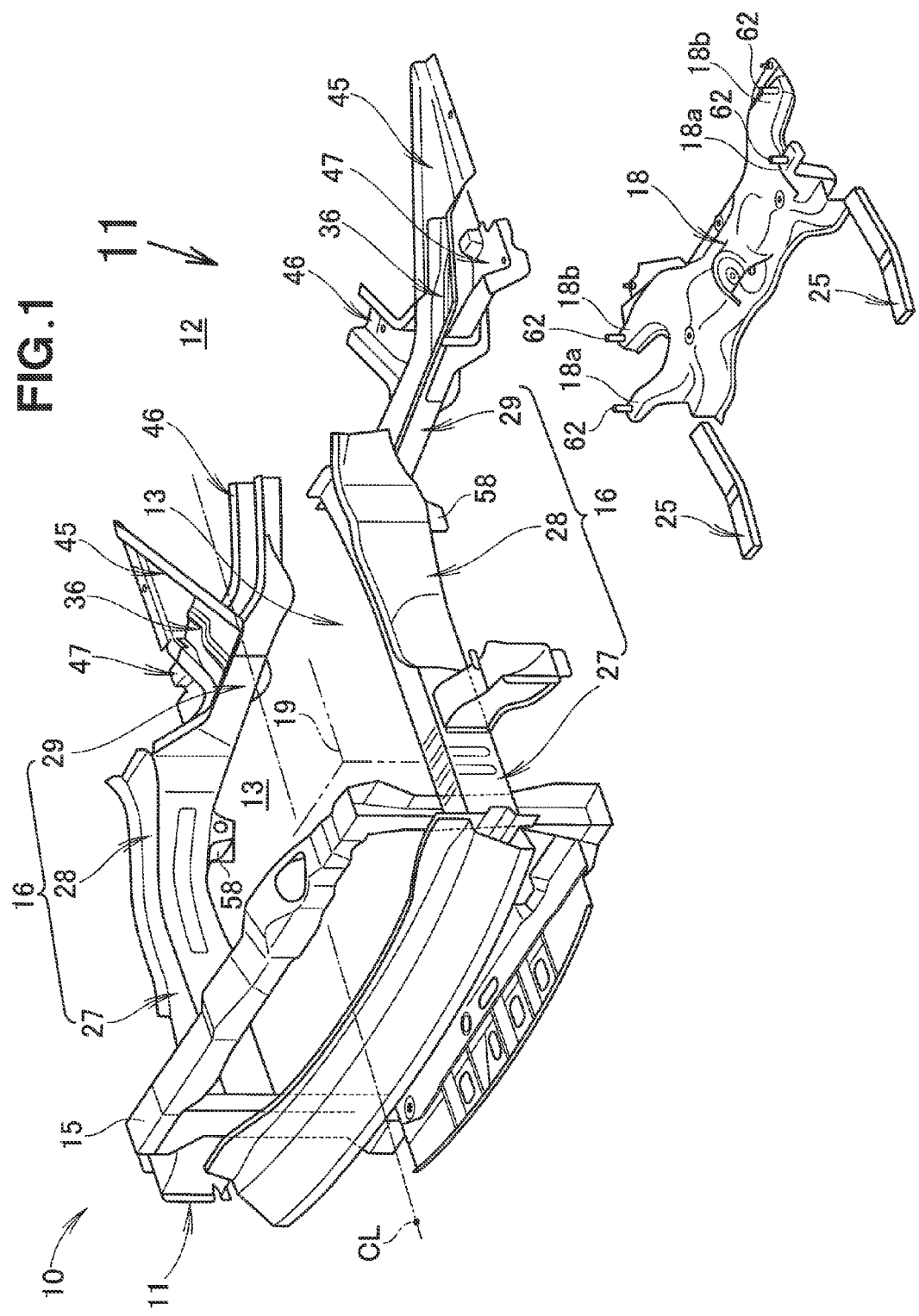
FIG. 1 is a left upper perspective view showing an embodiment of a front vehicle body structure of the present invention.

In FIG. 1 a vehicle 10, which is a passenger vehicle, includes, inside a vehicle body 11, a power-unit-accommodating compartment 13 and a passenger compartment 12 located immediately behind the power-unit-accommodating compartment 13. The vehicle body 11 is a so-called monocoque body, which is formed in left-right symmetry with respect to a vehicle-widthwise centerline CL extending in a front-rear direction of the vehicle body centrally across the width of the vehicle 10.

Figure 4:
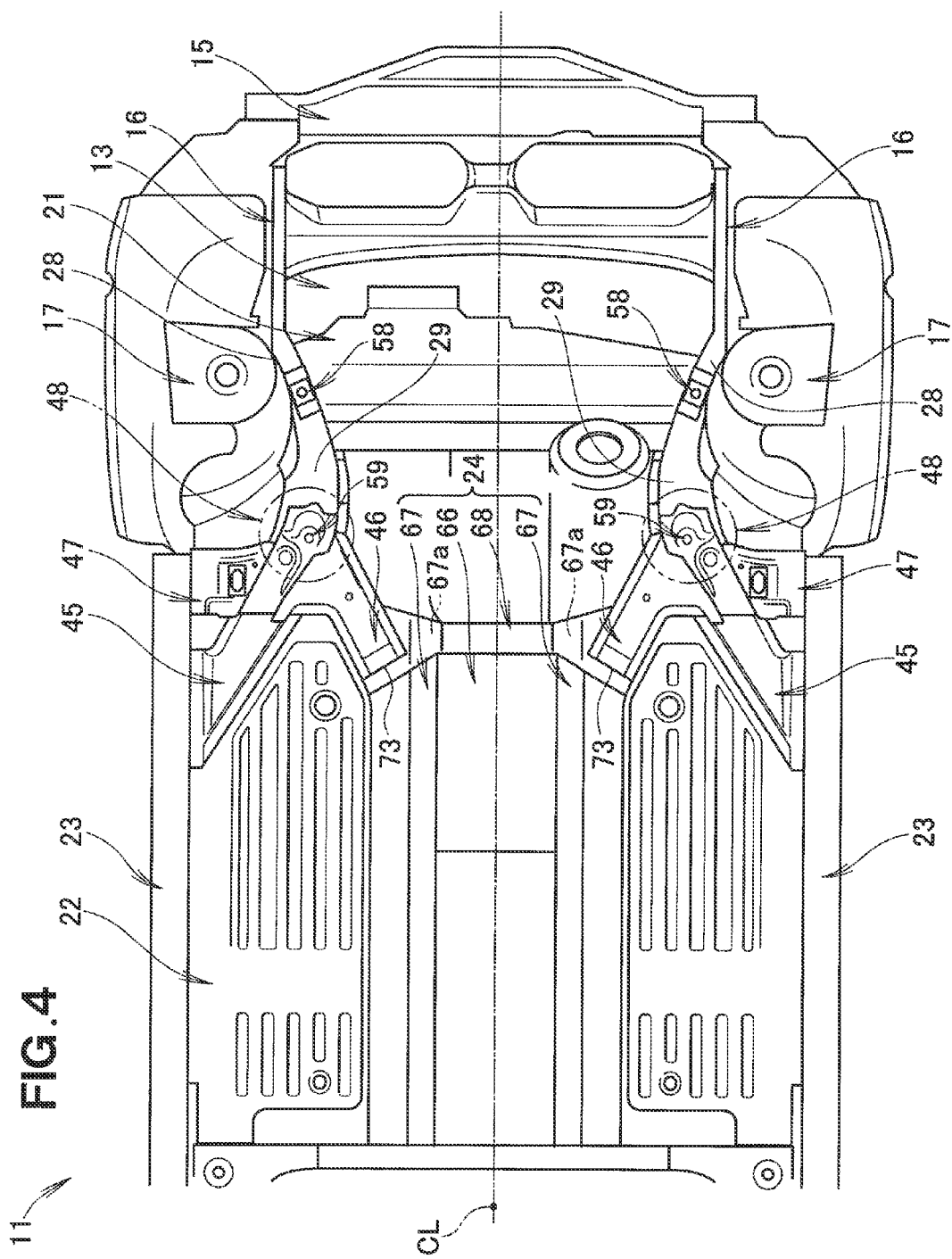
FIG. 4 is a bottom view showing the front section of the vehicle body shown in FIG. 1.

As shown in FIGS. 1 and 4, the vehicle body 11 includes, in its front half section: a front bulkhead 15; left and right front side frames 16, left and right front damper houses 17; a lower dashboard panel 21; a floor panel 22; left and right side sills 23; and a tunnel section 24.

The left and right front side frames 16 are located on left and right sides of a front section of the vehicle body 11 and extending in the front-rear direction of the vehicle body 11. The front bulkhead 15 is joined to the respective front ends of the left and right front side frames 16. The left and right front damper houses 17 each located laterally outward, in the vehicle width direction, of a longitudinally middle part of a corresponding one of the front side frames 16 and covers an upper half portion of a not-shown front wheel.

As shown in FIG. 1, a sub frame 18 is superposed and mounted from below on lower end portions of the left and right front side frames 16. A mounting structure of the sub frame 18 will be described later. The sub frame 18 is connected at its front portion to the underside of the front bulkhead 15 via load path members 25. Thus, when a frontal collision of the vehicle 10 has occurred, collision force from the front of the vehicle body can be smoothly transmitted from the front bulkhead 15 to the sub frame 18 via the load path members 25.

Figure 14:
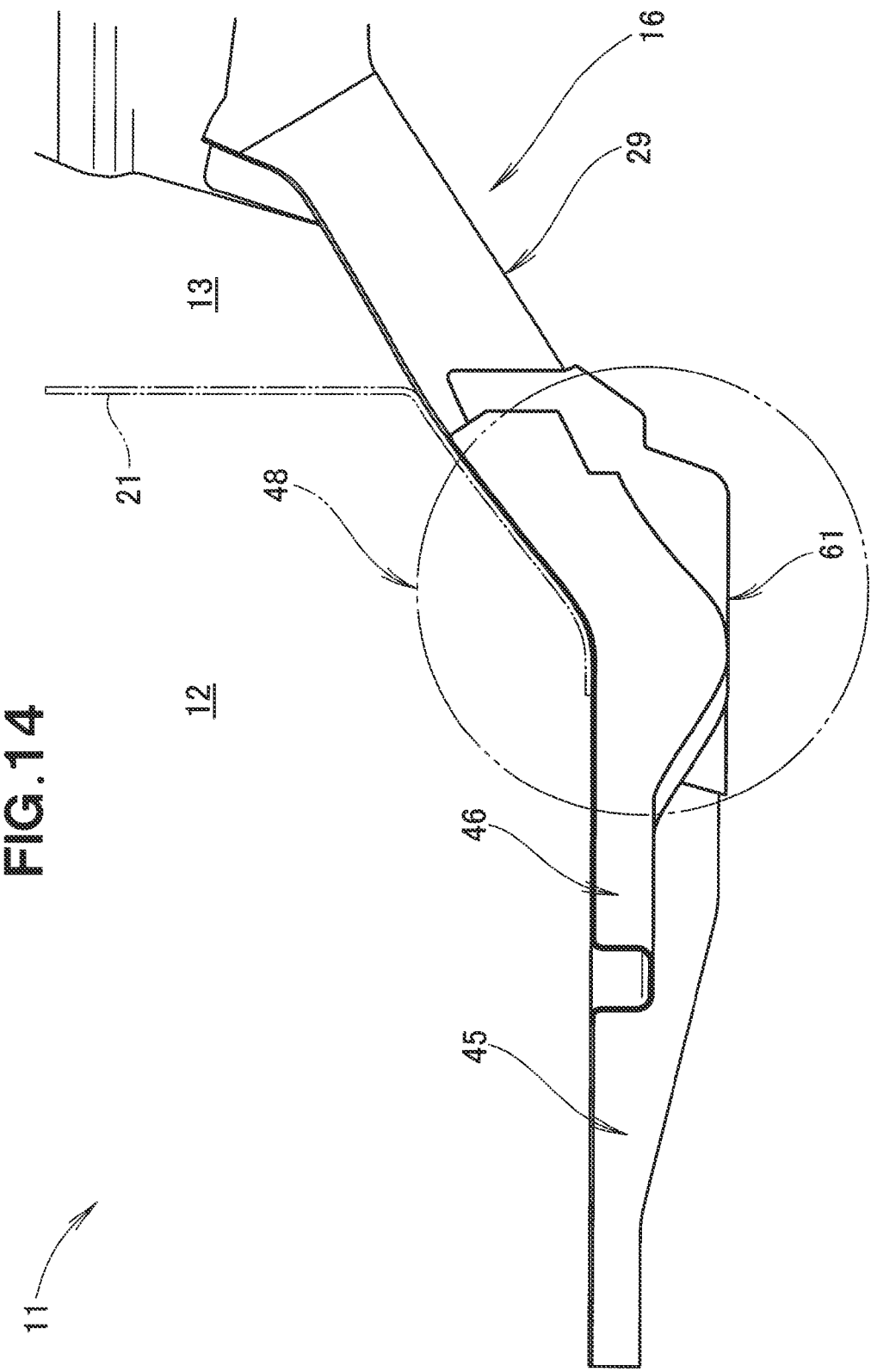
FIG. 14 is a side view showing, from a vehicle widthwise central region, the left branch section of FIG. 5 and other sections therearound.

Further, as shown in FIGS. 4 and 14, the lower dashboard panel 21 is located rearward of or behind the left and right front side frames 16 for partitioning the vehicle body 11 into front and rear sections, i.e. partitioning between the front power-unit-accommodating compartment 13 and the rear passenger compartment 12.

As shown in FIG. 4, the floor panel 22 is a flat plate-shaped member extending rearward from a lower portion of the lower dashboard panel 21. The left and right side sills 23 are disposed rearward of, or behind, the lower dashboard panel 21 and on opposite ends, in the vehicle width direction, of the floor panel 22 and extending in the front-rear direction of the vehicle body. The floor panel 22 extends between the left and right side sills 23.

The tunnel section 24 is disposed rearward of the lower dashboard panel 21 and on a middle region, in the vehicle width direction, (i.e., vehicle widthwise middle region) of the floor panel 22 and extending in the front-rear direction of the vehicle body.

The following describe in detail the instant embodiment of the front vehicle body structure. As shown in FIGS. 1, 2, 19 and 21, each of the left and right front side frames 16 is formed in a closed sectional shape. Namely, each of the left and right front side frames 16 is a hollow member of a substantially rectangular sectional shape, which includes: a bottom plate 16a; an inner plate 16b located inward in the vehicle width direction (i.e., inner wall 16b located inward in the vehicle width direction); an outer plate 16c located outward in the vehicle width direction (i.e., outer wall 16c located outward in the vehicle width direction); and a top plate 16d. A bead 74 elongated in the front-rear direction of the vehicle body is formed on the inner wall 16b, and the bead 74 has a sectional shape convexed toward the outer plate 16c.

Each of the left and right front side frames 16 includes a straight section 27 constituting a front half portion of the front side frame 16, and a curved section 28 constituting a rear half portion of the front side frame 16. Namely, the front half portion of each of the left and right front side frames 16 extends straight in the front-rear direction of the vehicle body, while the rear half portion of each of the left and right front side frames 16 extends rearward or toward the rear of the vehicle body while curving from outside to inside in the vehicle width direction.

Further, as shown in FIGS. 1 and 14, a rear section 29 of each of the left and right front side frames 16 is constructed as a bent structure in which the rear section 29 is bent rearward and downward along the underside of the lower dashboard panel 21 with its rear lower end portion 29a bent rearward or toward the rear of the vehicle body. The rear sections 29 of the left and right front side frames 16 will hereinafter be referred to also as "left and right bent sections 29" as necessary. Namely, the left and right bent sections 29 slope rearward and downward along the underside of the lower dashboard panel 21 with their respective rear lower end portions 29a extending horizontally toward the rear of the vehicle body.

Further, as shown in FIGS. 1, 4, 7 and 11 to 15, the rear end part of each of the left and right front side frames 16, i.e. the rear end portion 29a of each of the left and right bent sections 29 branches into a side-sill-side extension 45 and a tunnel-side extension 46. Namely, the rear end portion 29a of each of the left and right bent sections 29, side-sill-side extension 45 and tunnel-side extension 46 are formed as a whole in a substantially Y shape as viewed in plan.

On each of the left and right sides of the vehicle body, a section 48 which branches from the rear end of the left or right front side frame 16 into the side-sill-side extension 45 and the tunnel-side extension 46 (i.e., into the left or right side-sill-side extension 45 and the left or right tunnel-side extension 46) will hereinafter be referred to as "branch section 48".

The side-sill-side extension 45 of each of the left and right front side frames 16 (i.e., left or right side-sill-side extension 45) branches and slantingly extends from the rear end part of the front side frame 16, i.e. the rear end portion 29*a* (FIG. 7) of the bent section 29 rearwardly and outwardly in the vehicle width direction continuously with the closed section of the front side frame 16 and is joined to a front portion of a corresponding one of the left and right side sills 23.

The tunnel-side extension 46 of each of the left and right front side frames 16 (i.e., left or right tunnel-side extension 46) branches and slantingly extends from an inner plate 45*b* (inner wall 45*b* located inward in the vehicle width direction) rearwardly and inwardly in the vehicle width direction and is joined to a front portion of the tunnel section 24.

An angle θ2 at which each of the left and right tunnel-side extensions 46 slants inward in the vehicle width direction is set substantially equal to an angle θ1 at which each of the left and right side-sill-side extensions 45 slants outward in the vehicle width direction.

Figure 7:
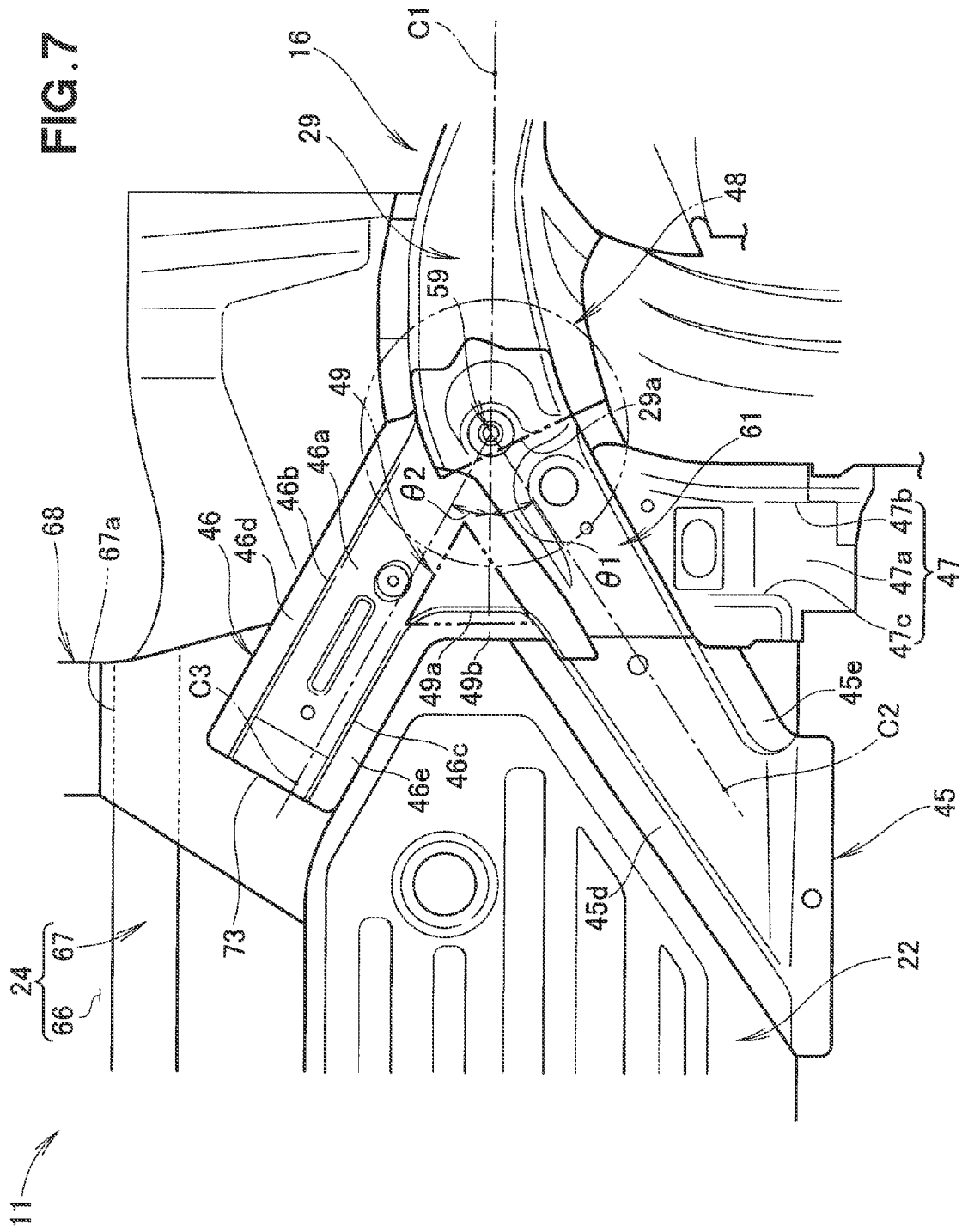
FIG. 7 is a bottom view showing in enlarged scale the left side-sill-side extension and the left tunnel-side extension branched from the left front side frame shown in FIG. 4.

More specifically, as shown in FIG. 7, a straight line C1 extending in the front-rear direction of the vehicle body centrally through the width of a rear portion of the branch section 48 as viewed from below the vehicle body 11 will hereinafter be referred to as "first extension line C1". The first extension line C1 is parallel to the vehicle-widthwise centerline CL (FIG. 4). Further, a straight line C2 extending from the vehicle-widthwise center of the rear portion of the branch section 48, along the longitudinal axis of the side-sill-side extension 45, rearwardly and outwardly in the vehicle width direction will hereinafter be referred to as "second extension line C2". A straight line C3 extending from the vehicle-widthwise center of the rear portion of the branch section 48, along the longitudinal axis of the tunnel-side extension 46, rearwardly and inwardly in the vehicle width direction will hereinafter be referred to as "third extension line C3". An angle of slope θ1 defined between the first extension line C1 and the second extension line C2 is substantially equal to an angle of slope θ2 defined between the first extension line C1 and the third extension line C3. Each of these angles of slope θ1 and θ2 is preferably 30°±10° in view of a load transmitting efficiency. Arrangements in the right side of the vehicle body 11 are similar to the aforementioned arrangements in the left side of the vehicle body 11 and will not be described to avoid unnecessary duplication.

Figure 5:
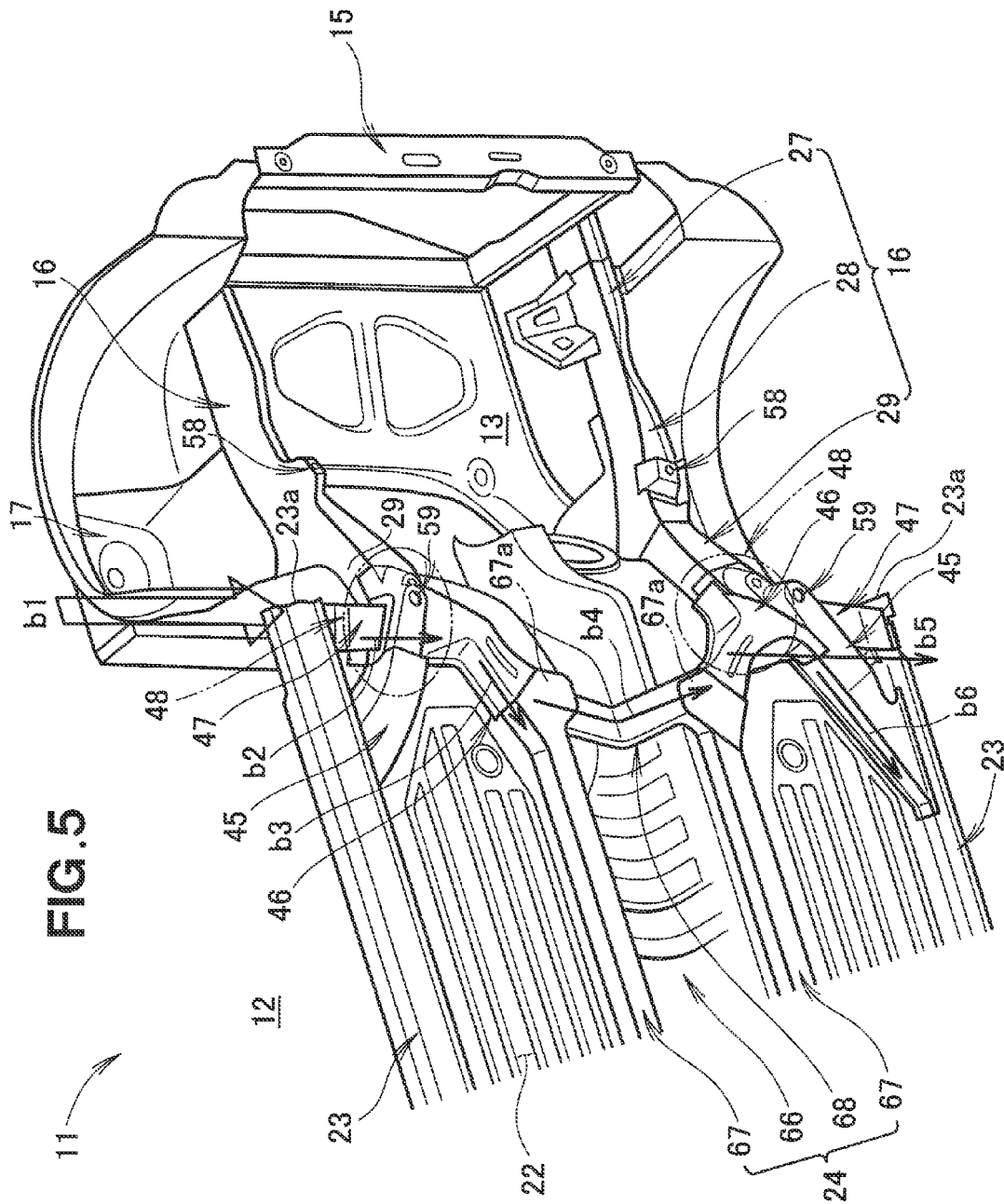
FIG. 5 is a right lower perspective view showing the front section of the vehicle body shown in FIG. 1.

Further, as shown in FIGS. 4 and 5, the tunnel section 24 includes a center tunnel 66, tunnel frames 67 provided on the left and right sides of the center tunnel 66 and a tunnel cross member 68. The center tunnel 66 protrudes upward from a central part, in the vehicle width direction, vehicle widthwise central part) of the floor panel 22 and extends in the front-rear direction of the vehicle body. The tunnel frames 67 are provided on the left and right sides of the center tunnel 66 and extending in the front-rear direction of the vehicle body.

The tunnel cross member 68 is a member that extends in the vehicle width direction to connect at least either between the rear ends 73 of the left and right tunnel-side extensions 46 or between the front ends 67*a* of the left and right tunnel frames 67. In the instant embodiment, the tunnel cross member 68 connects both between the rear ends 73 of the left and right tunnel-side extensions 46 and between the front ends 67*a* of the left and right tunnel frames 67. A vehicle-widthwise central portion of the tunnel cross member 68 convexly bends upward in conformity with the protruding shape of the center tunnel 66.

The left and right side-sill-side extensions 45 are connected at their respective front end portions to the left and right side sills 23 via left and right outriggers 47, respectively.

Namely, the left and right outriggers 47 extend from outer walls 45*c* of front end portions of the left and right side-sill-side extensions 45 outwardly in the vehicle width direction and are joined to front end portions of the left and right side sills 23, respectively.

Figure 11:
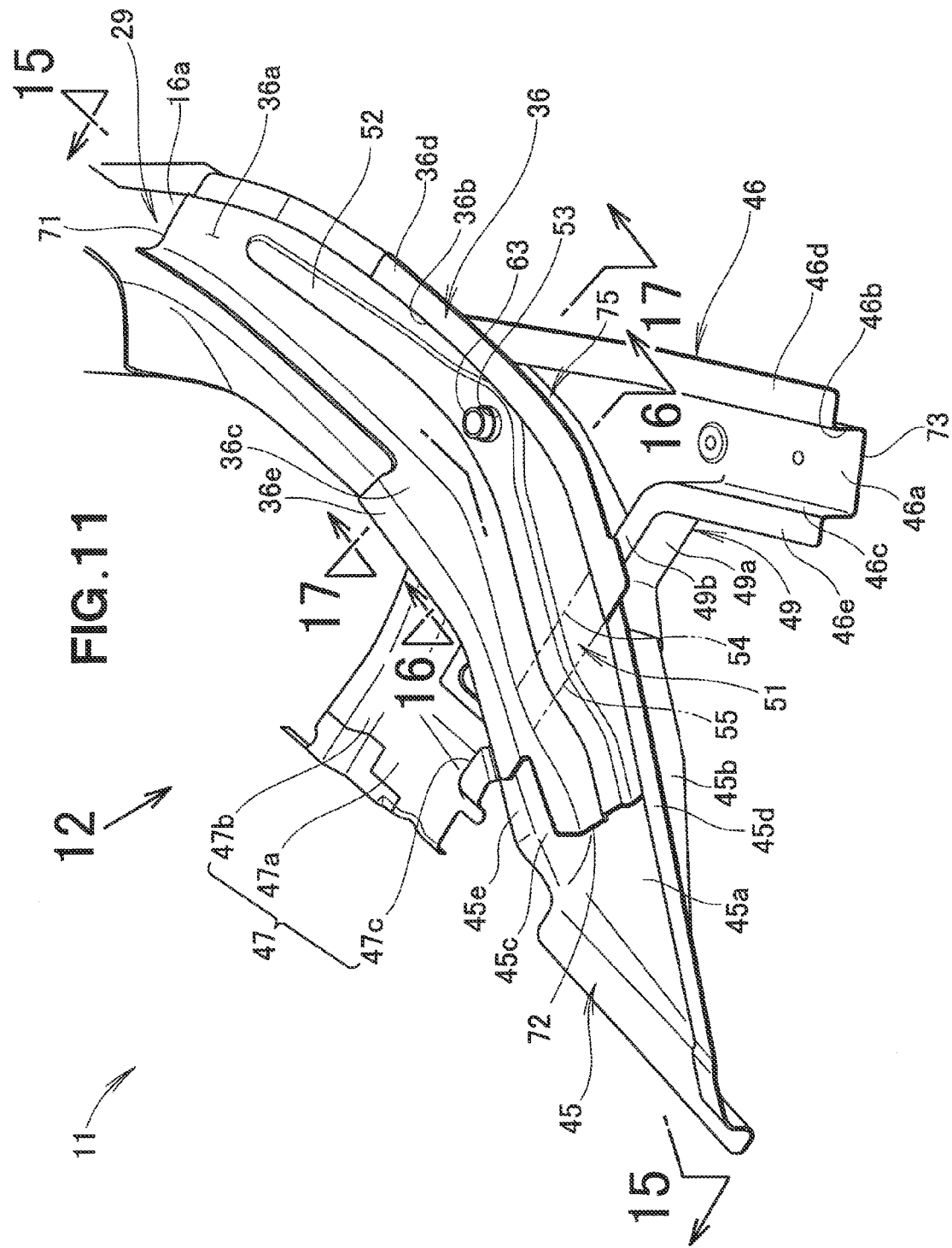
FIG. 11 is a perspective view taken in a direction of arrow 11 of FIG. 1.

More specifically, each of the left and right outriggers 47 extends from a portion of the left or right side-sill-side extension 45 opposite from a portion of the left or right side-sill-side extension 45 from which the left or right tunnel-side extension 46 branches. A joined portion of each of the left and right outriggers 47 to the left or right side sill 23 is located forward of a joined portion of the left or right side-sill-side extension 45 to the left or right side sill 23. As shown in FIG. 11, a part 75 where the left tunnel-side extension 46 is joined to the left side-sill-side extension 45 will hereinafter be referred to as "inner-wall-side joint section 75".

As shown in FIG. 7, each of the left and right outriggers 47 is formed in an upwardly-opening U sectional shape and has a bottom plate 47*a* and front and rear plates 47*b* and 47*c* projecting upward from front and rear edge portions of the bottom plate 47*a*.

Figure 16:
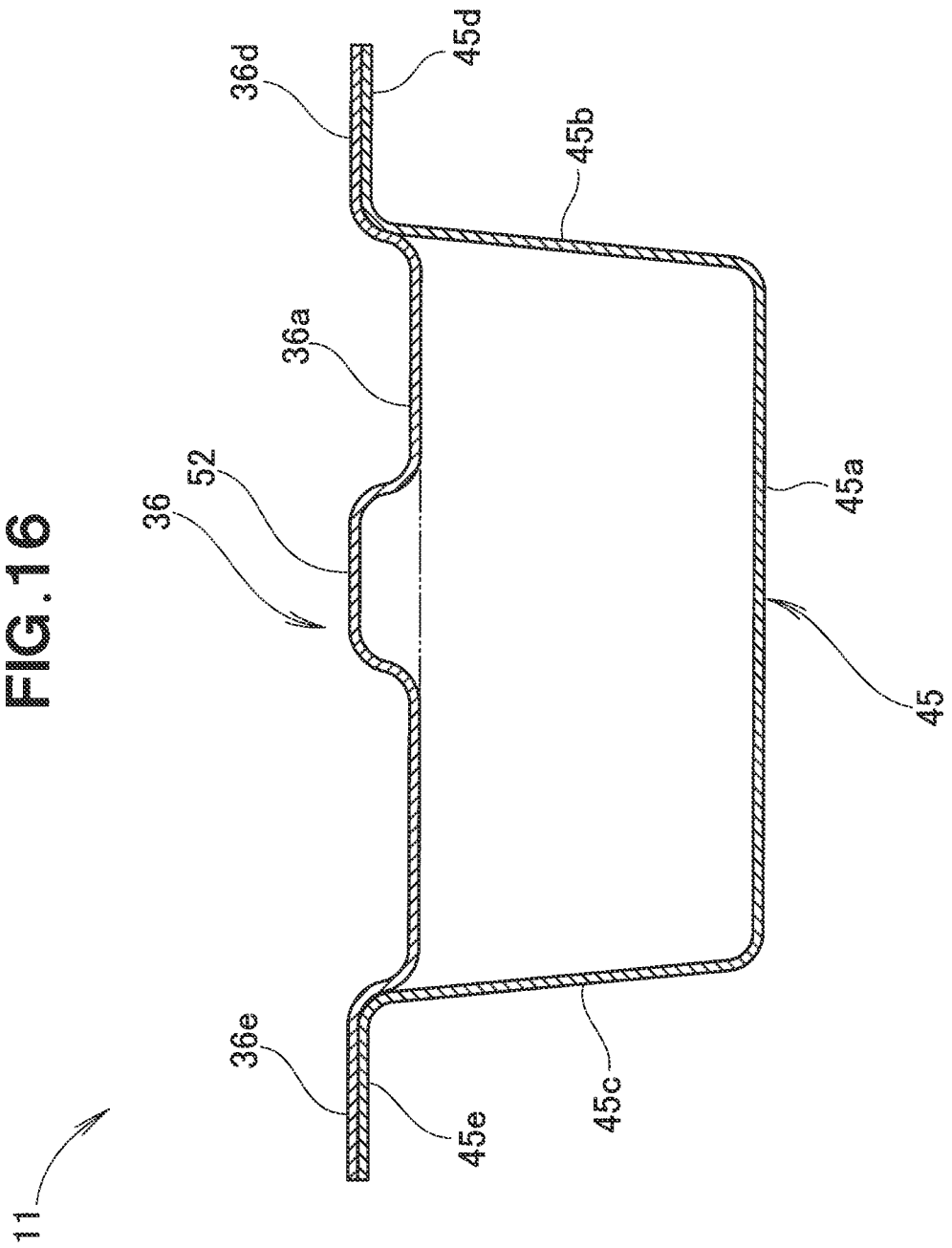
FIG. 16 is a sectional view taken along line 16-16 of FIG. 11.
Figure 17:
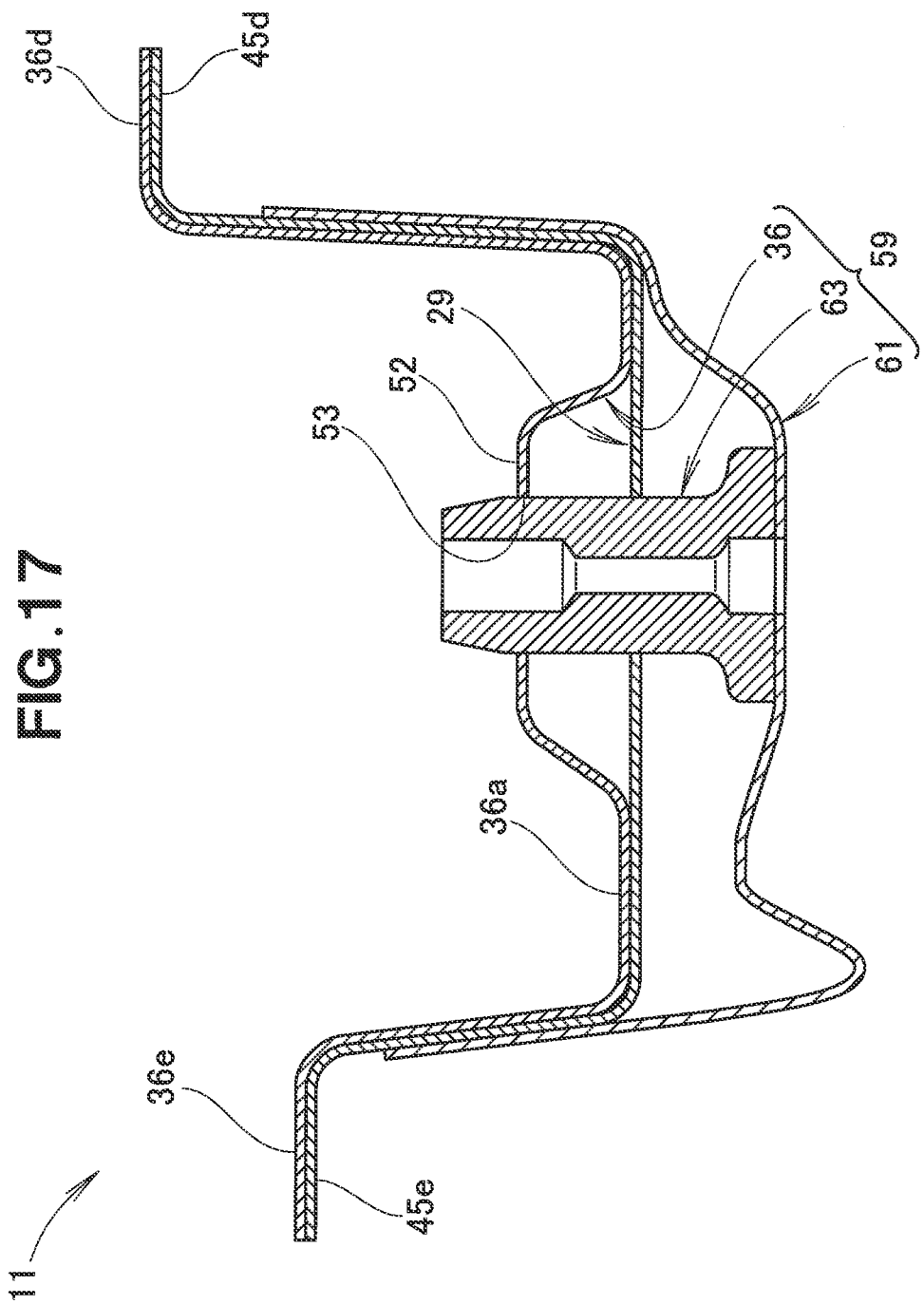
FIG. 17 is a sectional view taken along line 17-17 of FIG. 11.

Further, as shown in FIGS. 11 and 16, the left and right side-sill-side extensions 45 and left and right tunnel-side extension 46 are each a member of an upwardly-opening hat-like sectional shape.

Namely, the left side-sill-side extension 45 includes a bottom plate 45*a*; the inner plate 45*b* (inner wall 45*b* located inward in the vehicle width direction) projecting upward from the bottom plate 45*a*; the outer plate 45*c* (outer wall 45*c* located outward in the vehicle width direction) projecting upward from the bottom plate 45*a*; an inner flange 45*d* bent from the upper end edge of the inner plate 45*b*; and an outer flange 45*e* bent from the upper end edge of the outer plate 45*c*. The right side-sill-side extension 45 is of the same construction as the left side-sill-side extension 45.

The left tunnel-side extension 46 includes a bottom plate 46*a*; inner and outer plates 46*b* and 46*c* projecting upward from the bottom plate 46*a*; an inner flange 46*d* bent from the upper end edge of the inner plate 46*b*; and an outer flange 46*e* bent from the upper end edge of the outer plate 46*c*. The right tunnel-side extension 46 is of the same construction as the left tunnel-side extension 46.

Figure 6:
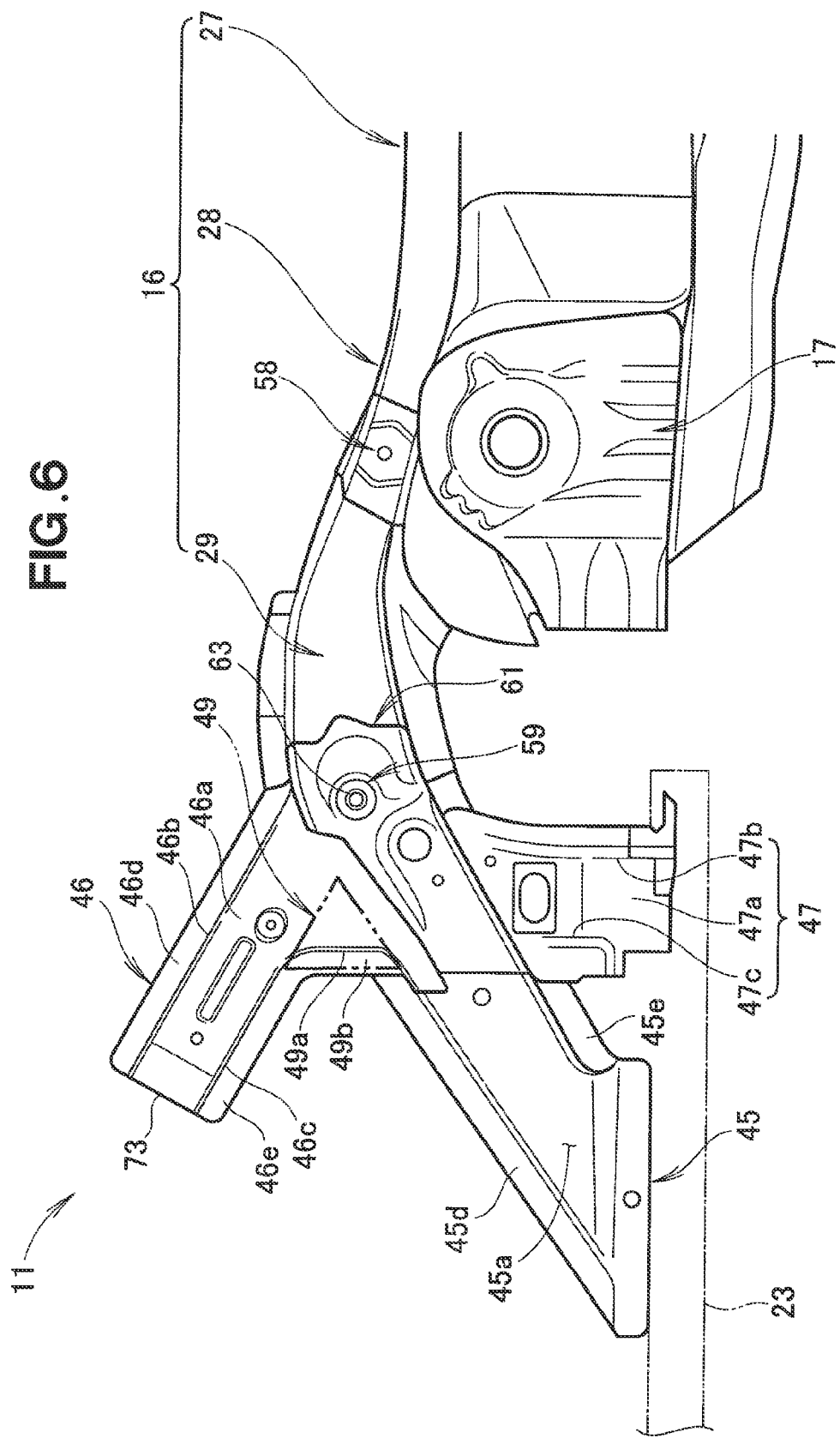
FIG. 6 is a bottom view showing a left side-sill-side extension and a left tunnel-side extension branched from the left front side frame shown in FIG. 4.

Further, as shown in FIGS. 6, 7 and 11, the left side-sill-side extension 45 and the left tunnel-side extension 46 are interconnected via a left load receiving section 49 while the right side-sill-side extension 45 and the right tunnel-side extension 46 are interconnected via a right load receiving section 49, and each of the left and right load receiving sections 49 has a triangular shape as viewed in plan. The left and right load receiving sections 49 are located immediately behind and formed integrally with the left and right branch sections 46 but also joined to the left and right side-sill-side extensions 45.

Namely the left load receiving section 49 comprises a part of the bottom plate 46*a* of the left tunnel-side extension 46, a rear wall 49*a* and a rear flange 49*b*. The rear wall 49*a* is formed continuously with the outer plate 46*c* and extends in the vehicle width direction, and the rear flange 49*b* is formed continuously with the outer flange 46*e*. The right load receiving section 49 is of the same construction as the left load receiving section 49.

Respective widths of the left and right bent sections 29, left and right side-sill-side extensions 45, left and right tunnel-side extensions 46 and left and right outriggers 47 are substantially equal to one another.

Sectional heights of the left and right bent sections 29, left and right side-sill-side extensions 45, left and right tunnel-side extensions 46 and left and right outriggers 47 in the left and right branch sections 48 are greater than those of the other portions.

Therefore, sectional areas of the left and right bent sections 29, left and right side-sill-side extensions 45, left and right tunnel-side extensions 46 and left and right outriggers 47 in the left and right branch sections 48 are greater than those of the other portions. As a consequence, the left and right branch sections 48 have a great strength and rigidity.

Figure 3:
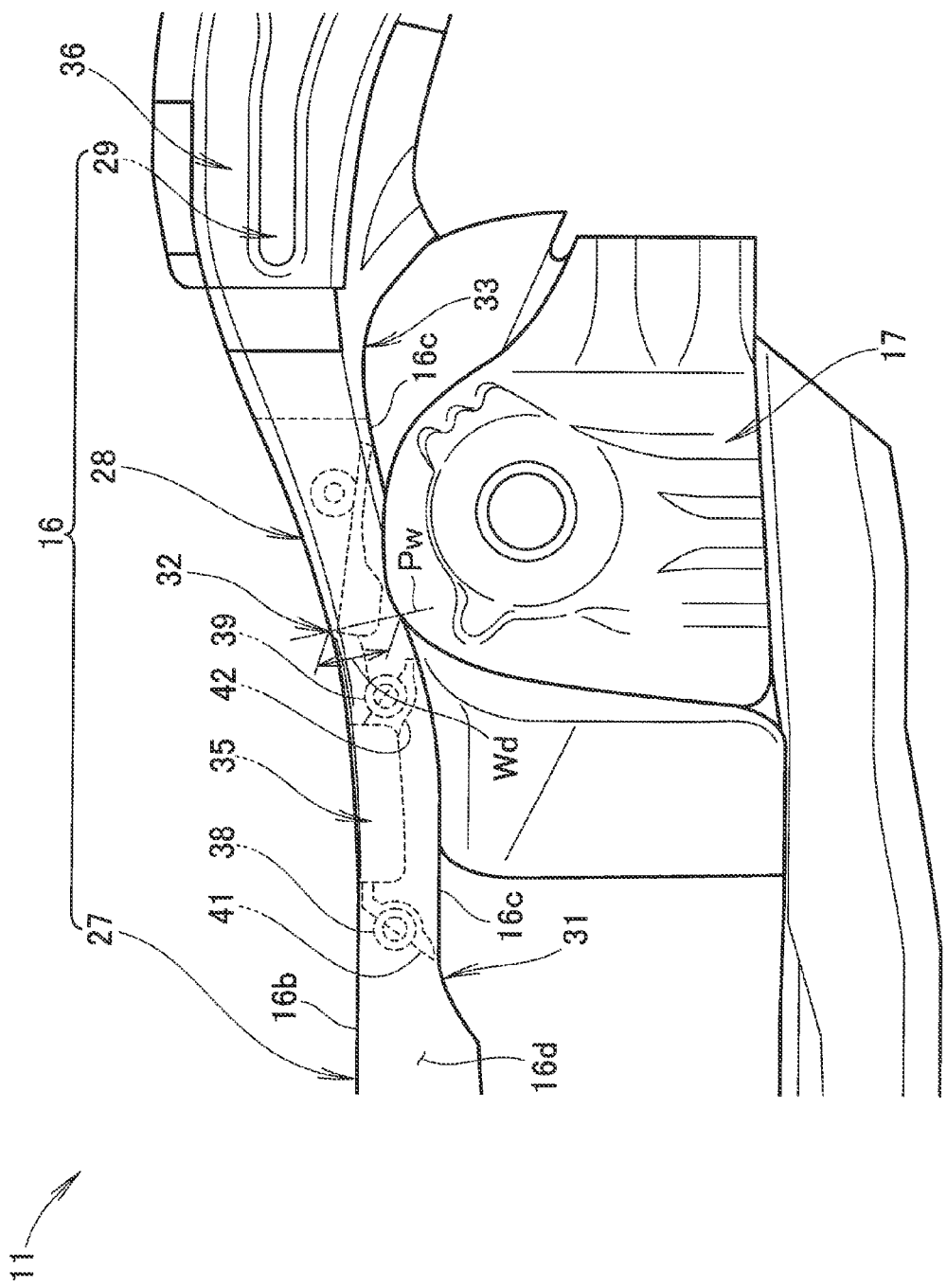
FIG. 3 is an enlarged view showing a curved section of a left front side frame shown in FIG. 2 and other sections therearound.

Further, as shown in FIG. 3, the curved section 28 of each of the left and right front side frames 16, i.e. each of the left and right curved sections 28, has a first fragile portion 31, a second fragile portion 32 and a third fragile portion 33 formed therein. The first fragile portion 31, second fragile portion 32 and third fragile portion 33 are formed sequentially from front to rear in the order they have been mentioned above and at predetermined intervals. The first fragile portion 31, second fragile portion 32 and third fragile portion 33 are more fragile against a load applied in the front-rear direction of the vehicle body than the other portions in each of the left and right front side frames 16.

The first fragile portion 31 is in the form of an easily deformable recessed portion for permitting bending inward, in the vehicle width direction, of the front side frame 16. The second fragile portion 32 is in the form of a recessed portion for permitting bending outward, in the vehicle width direction, of the front side frame 16. The third fragile portion 33 too is in the form of a recessed portion for permitting bending inward, in the vehicle width direction, of the front side frame 16.

At the time of occurrence of a frontal collision of the vehicle 10, collision force from the front of the vehicle body acts on the left and right front side frames 16. By causing the collision force from the front of the vehicle body to concentrate on the individual fragile portions 31, 32 and 33 of the left and right curved sections 28, the instant embodiment permits bending of the left and right front side frames 16.

The following describe in detail the second fragile portion 32 of the left front sub frame 16, i.e. the left second fragile portion 32. The right second fragile portion 32 will not be described here because it is of the same construction as the left second fragile portion 32 except that it is disposed in left-right symmetrical relation to the left second fragile portion 32. The left second fragile portion 32 more fragile against a load applied in the front-rear direction of the vehicle body than the other portions of the left front side frame 16 is provided on the inner wall 16b of the left curved section 28.

Further, as shown in FIGS. 3, 18, 19 and 21, the left second fragile portion 32 is in the form of a recessed portion dented by a depth ti at the maximum from the inner wall 16b of the left curved section 28 toward the interior of a closed section of the left curved section 28. The second fragile portion 32 will hereinafter be referred to as "recessed portion 32" as necessary. The recessed portion 32 is located on a part (small width part Pw) Pw of the left curved section 28 smaller in width Wd than the other portions of the left curved section 28.

Figure 19:
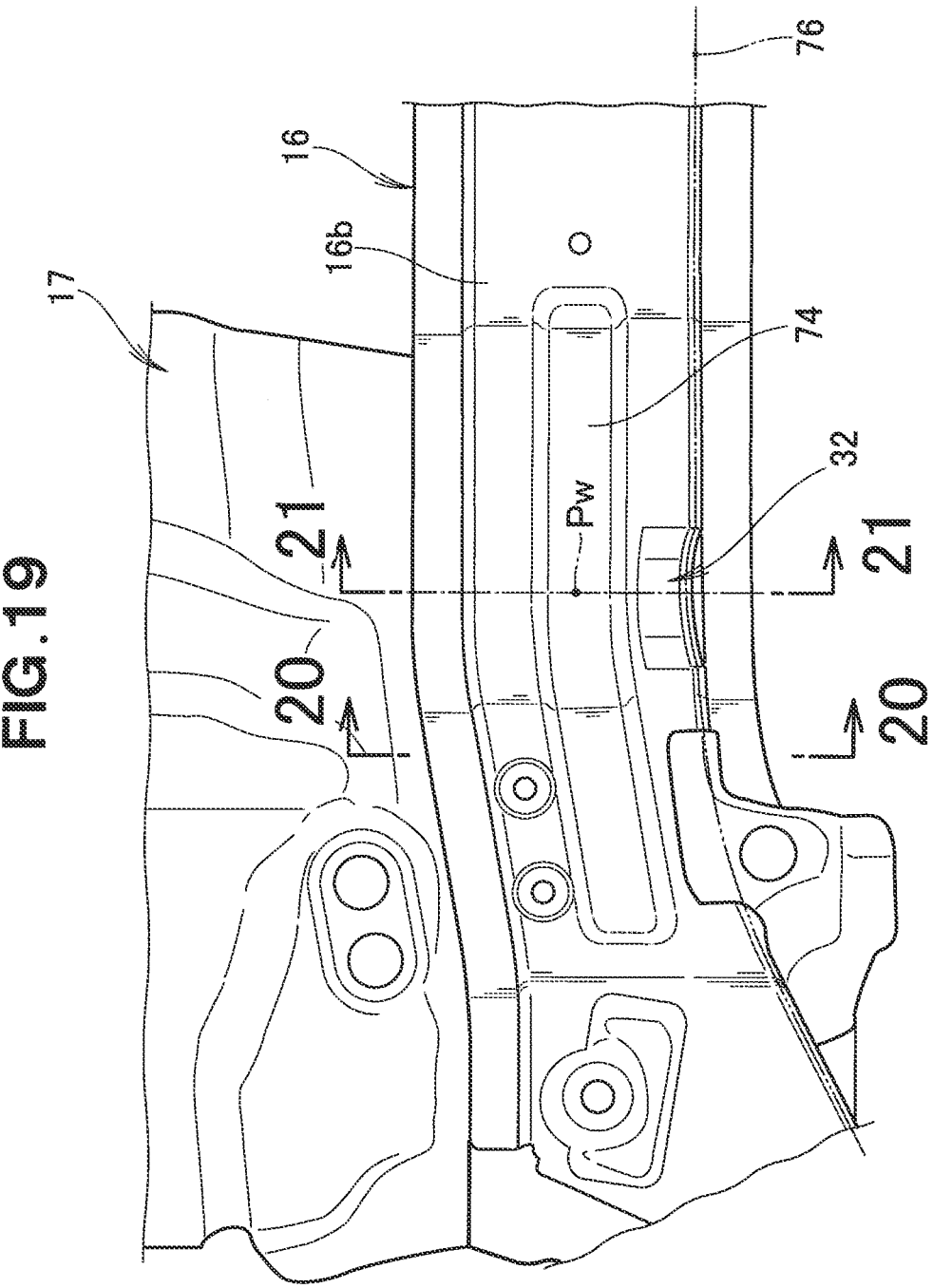
FIG. 19 is a side view showing the left front side frame from a vehicle widthwise middle region.
Figure 21:
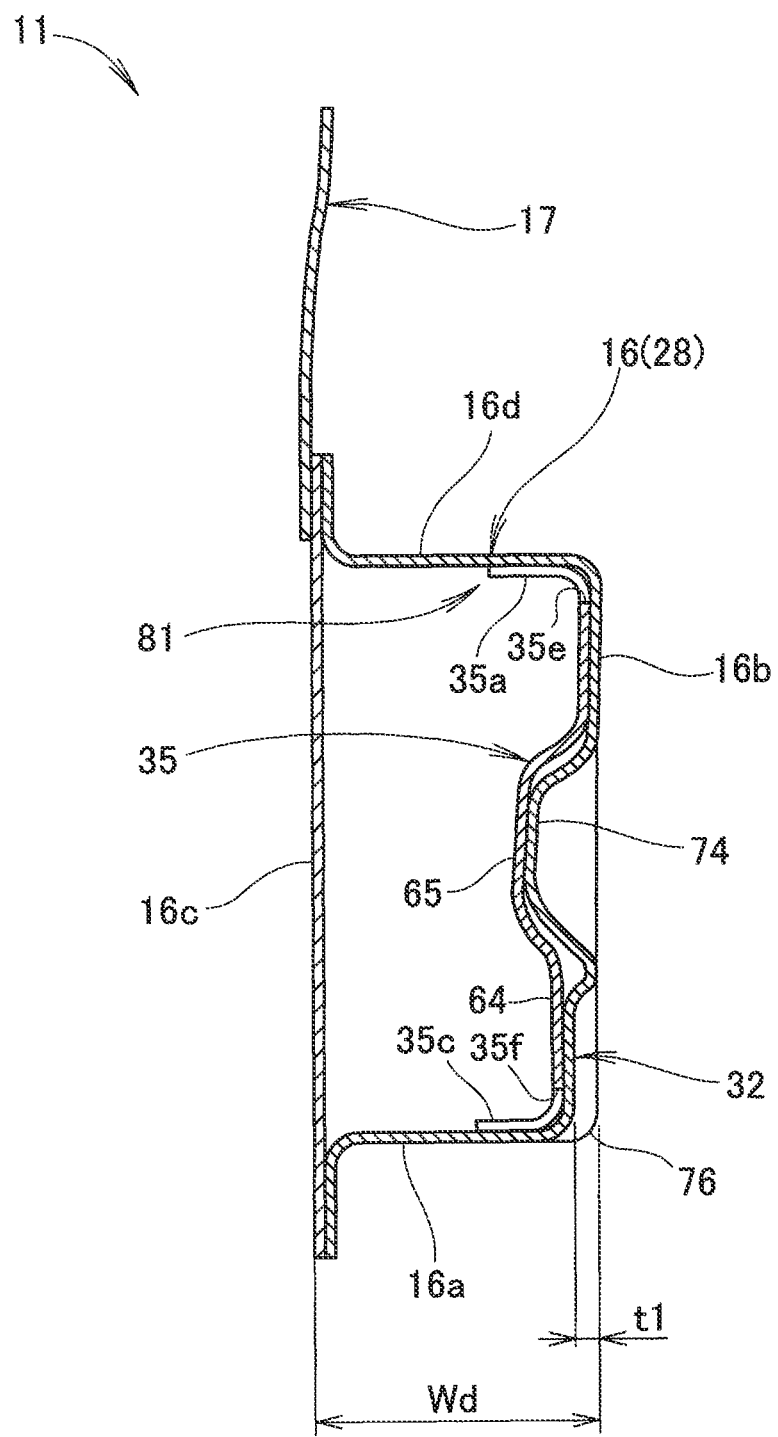
FIG. 21 is a sectional view taken along line 21-21 of FIG. 19.

Further, as shown in FIGS. 19 and 21, the left front side frame 16, formed in a substantially rectangular sectional shape, has a lower corner line 76 (ridgeline 76) extending in the front-rear direction along a corner between the bottom plate 16a and the inner wall 16b. The left recessed portion 32 is located adjacent to the lower edge of the bead 74 on the inner wall 16b and above the corner line 76, and it has, for example, a female tapered shape as viewed in plan.

When a frontal collision has occurred, a collision load from the front of the vehicle body can concentrate on the recessed portion 32 (second fragile portion 32) more easily than on the other portions. Besides, because the recessed portion 32 is located adjacent to the lower edge of the bead 74, stress will concentrate on the neighborhood of the corner line 76 of the front side frame 16. As a consequence, the neighborhood of the corner line 76 is bent locally. Because the left front side frame 16, formed in a substantially rectangular sectional shape, is deformed only locally in the neighborhood of the corner line 76, there would be involved only a little variation in the sectional area of the front side frame 16. Therefore, the overall strength and rigidity of the front side frame 16 can be maintained easily.

Further, as shown in FIGS. 2, 3, 9 and 10, a reinforcing member 35 is provided in the interior of each of the left and right curved sections 28 of the left and right front side frames 16. The following describe in detail the reinforcing member 35 of the left curved section 28, i.e. the left reinforcing member 35. The right reinforcing member 35 will not be described here because it is of the same construction as the left reinforcing member 35 except that it is disposed in left-right symmetrical relation to the left reinforcing member 35.

The left reinforcing member 35 extends substantially straight in the front-rear direction of the vehicle body from a portion of the inner wall 16b, located inward in the vehicle width direction, in front of the left curved section 28 to a portion of the outer wall 16c, located, outward in the vehicle width direction, behind the left curved section 28. The left reinforcing member 35 is joined at its front end to the inner wall 16b of the curved section 28 and joined at its rear end 69 to the outer wall 16c of the curved section 28. The left reinforcing member 35 is located between the first fragile portion 31 and the third fragile portion 33 (i.e., the left first fragile portion 31 and the left third fragile portion 33).

Figure 8:
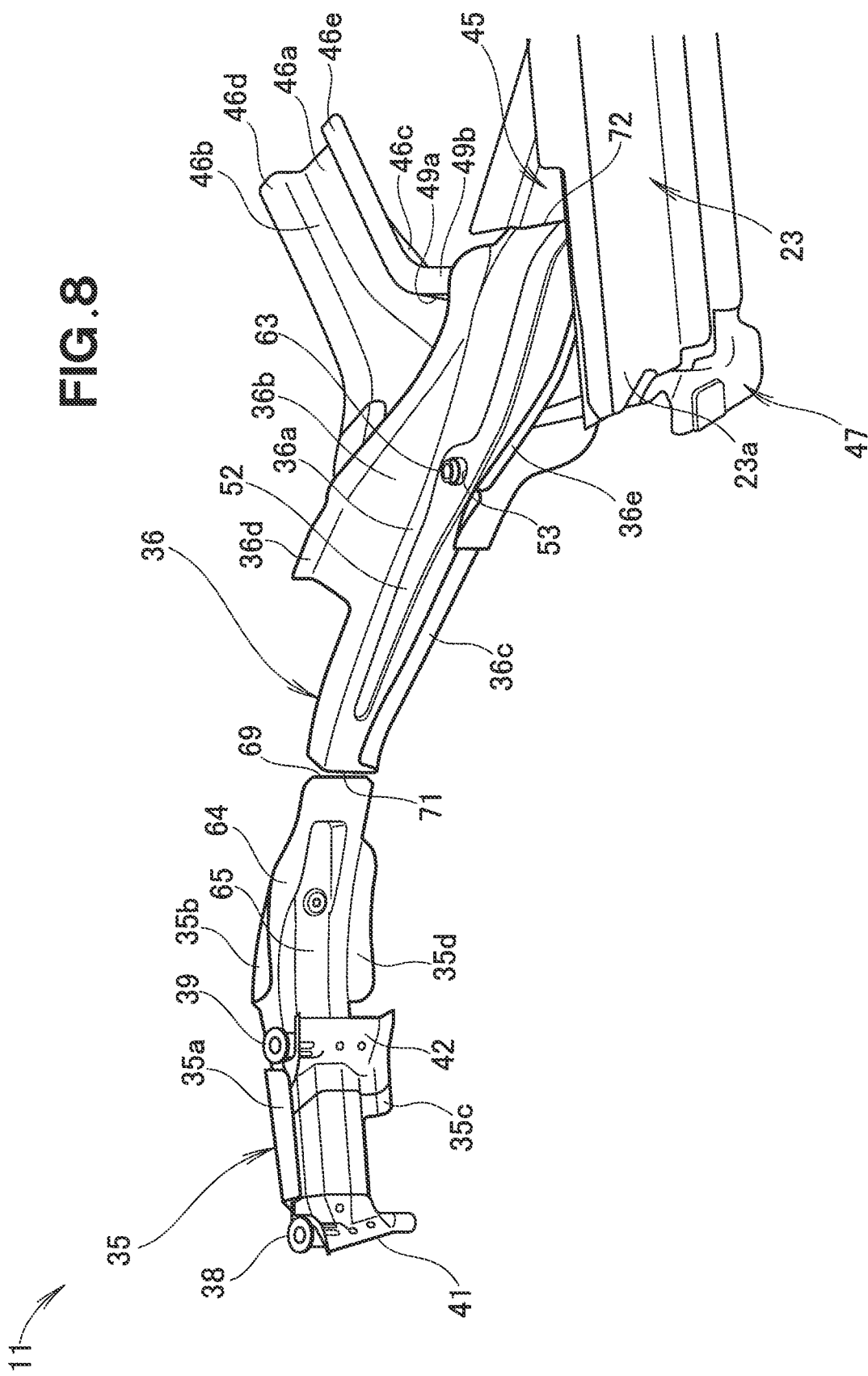
FIG. 8 is an upper perspective view showing relationship among a left reinforcing member, a left stiffener, the left side-sill-side extension and the left tunnel-side extension shown in FIG. 2.
Figure 9:
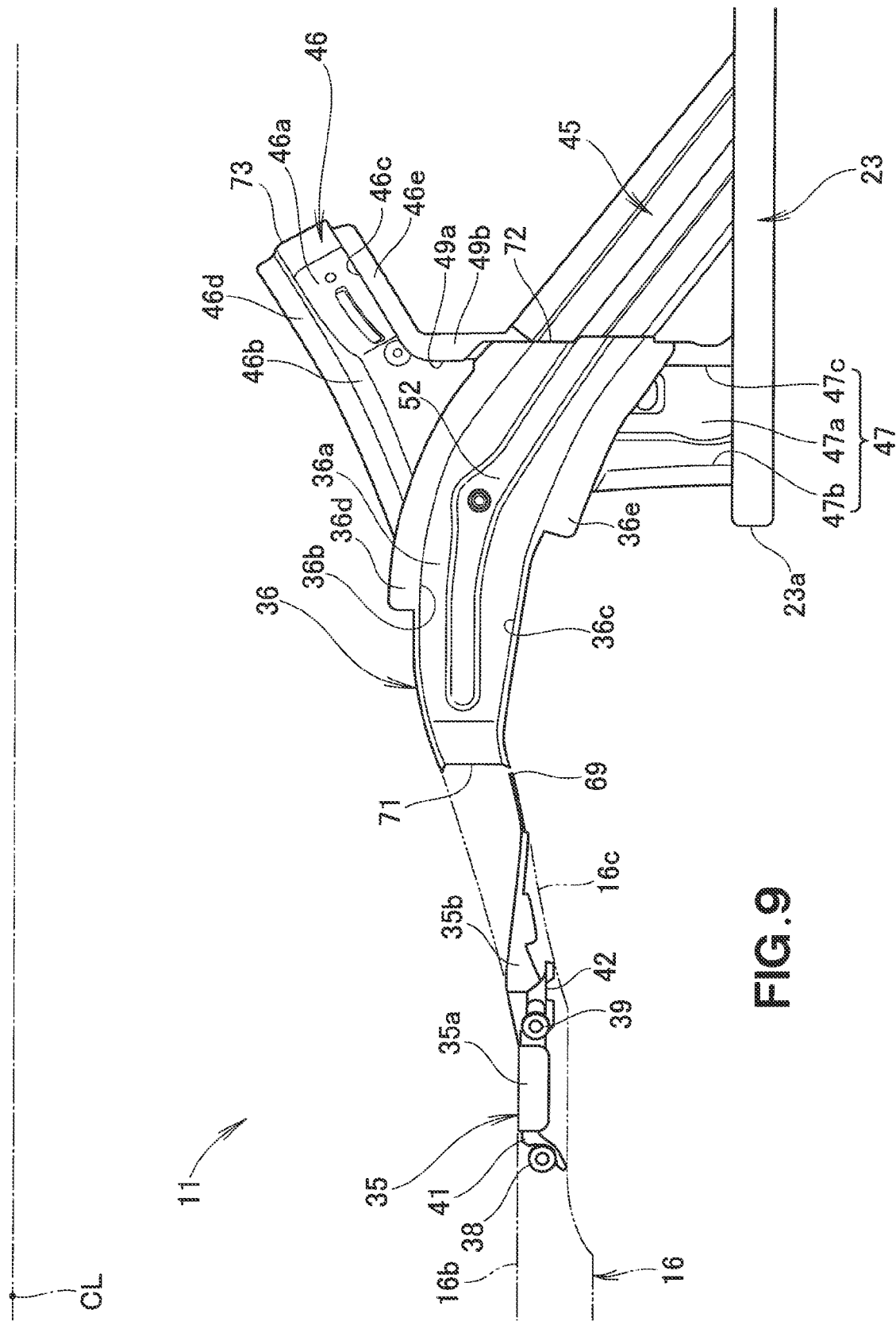
FIG. 9 is a plan view showing the relationship among the left reinforcing member, the left stiffener, the left side-sill-side extension and the left tunnel-side extension shown in FIG. 2.
Figure 10:
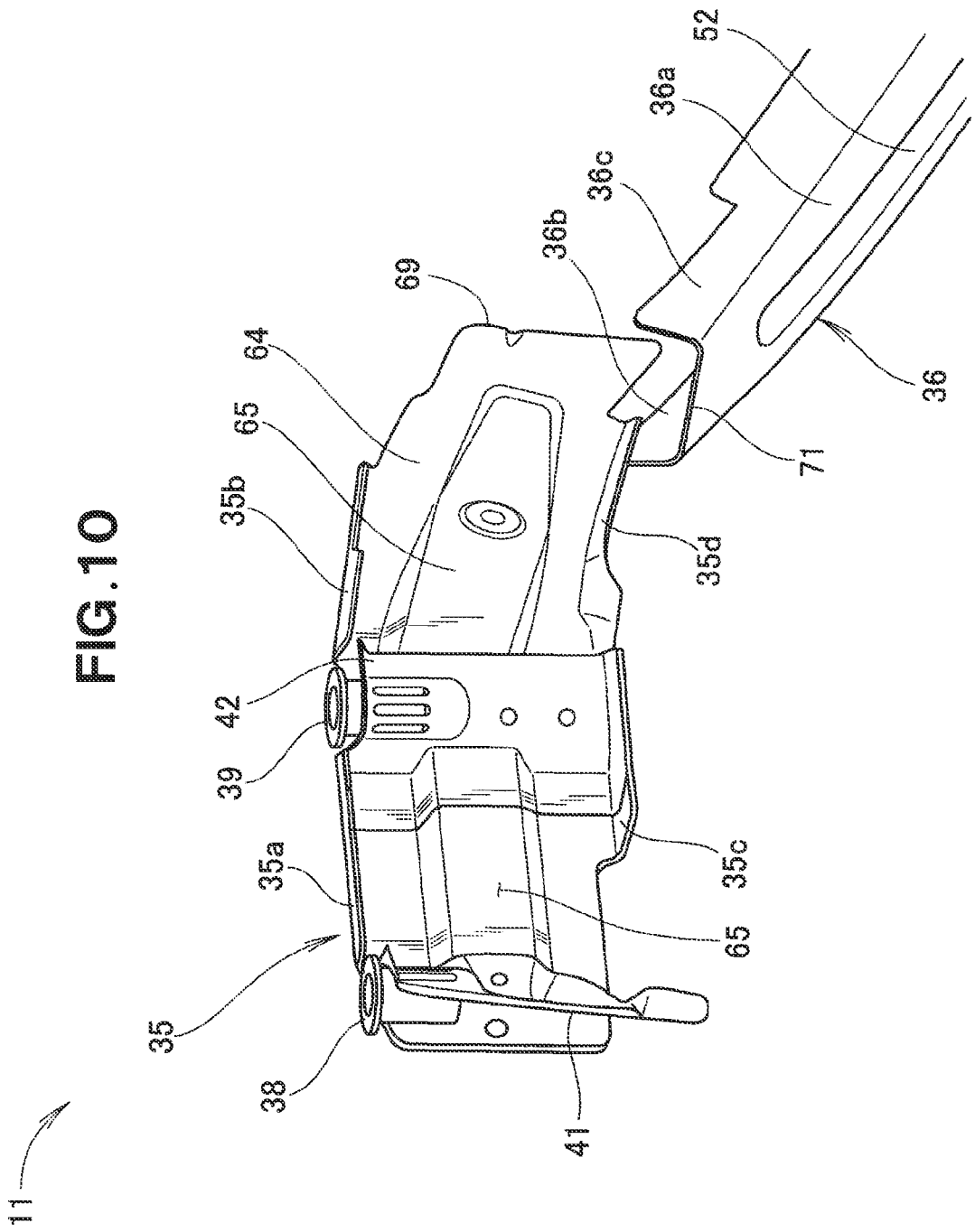
FIG. 10 is a perspective view showing in enlarged scale front portions of the left reinforcing member and the left stiffener shown in FIG. 8.
Figure 18:
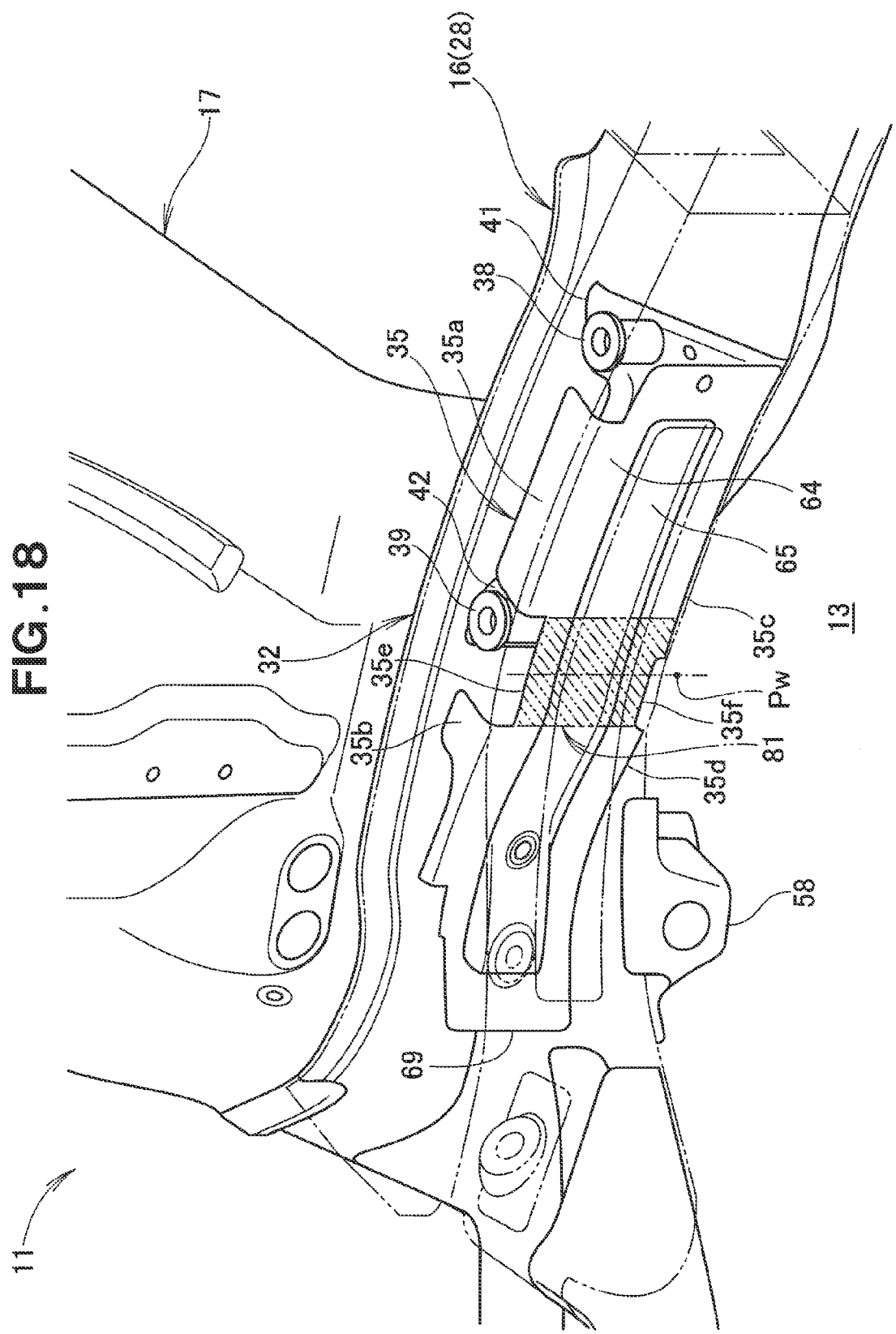
FIG. 18 is a perspective view showing the left reinforcing member of FIG. 3 from a vehicle widthwise central region.
Figure 20:
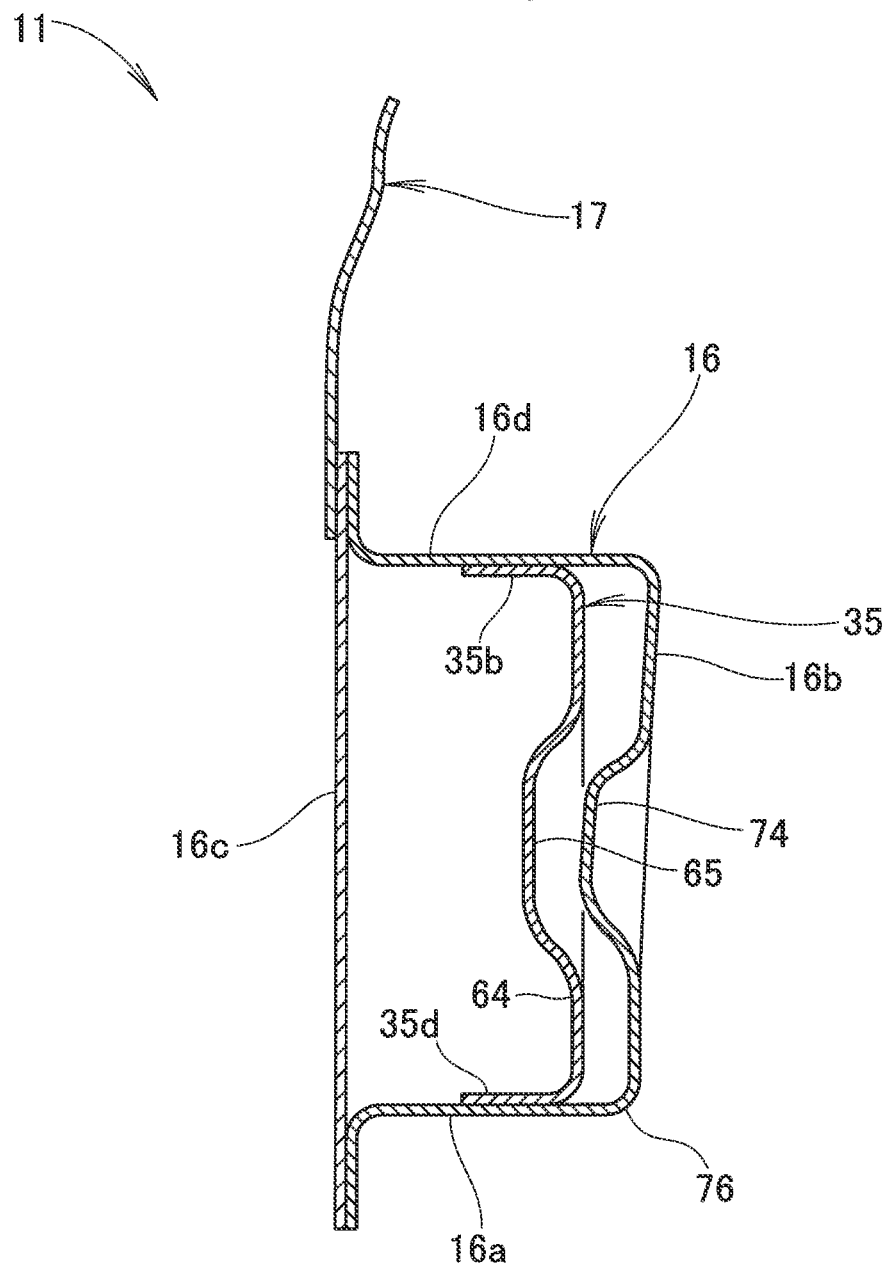
FIG. 20 is a sectional view taken along line 20-20 of FIG. 19.

As shown in FIGS. 8 to 10 and 18 to 20, the left reinforcing member 35 is formed in a U sectional shape opening toward the vehicle widthwise middle. More specifically, as shown in FIGS. 10, 18 and 20, the left reinforcing member 35, which, is formed by bending a plate material, has a bottom wall 64 defining the bottom of the U section, upper flanges 35a and 35b, and lower flanges 35c and 35d.

The bottom wall 64 is a vertical plate projecting upward along the inner plate 16b of the left front side frame 16 and has a bead 65 formed thereon to extend in the front-rear direction of the vehicle body. The bead 35 is an elongated bead formed along the head 74 formed on the inner plate 16b of the left front side frame 16. The bead 65 has a sectional shape convexed outward in the vehicle width direction.

The first and second upper flanges 35a and 35b are horizontal plates extending from the upper end of the bottom wall 64 substantially horizontally outward in the vehicle width direction. The first and second upper flanges 35a and 35b are superposed on and joined to the inner surface of the top plate 16d of the left front side frame 16. The first and second lower flanges 35c and 35d are horizontal plates extending from the lower end of the bottom wall 64 substantially horizontally outward in the vehicle width direction. The first and second lower flanges 35c and 35d are superposed on and joined to the inner surface of the bottom plate 16a of the left front side frame 16.

Further, as shown in FIGS. 18 and 21, the left reinforcing member 35, which is formed in a U sectional shape, has, in its halfway or intermediate position in the front-rear direction of the vehicle body (e.g. in the small-width part Pw), a partly-omitted sectional portion (left partly-omitted sectional portion) 81 having a sectional shape with parts of the U sectional shape taken away or omitted. The partly-omitted sectional portion 81 is provided, for example, by forming recesses 35e and 35f in upper and lower end portions of the reinforcing member 35. The first and second upper flanges 35a and 35b are spaced from each other in the front-rear direction of the vehicle body by the upper recess 35e, and the first and second lower flanges 35c and 35d are spaced from each other in the front-rear direction of the vehicle body by the lower recess 35f. As shown in FIG. 21, the left fragile portion 32 is disposed in opposed relation to the partly-omitted sectional portion 81.

Further, as shown in FIGS. 3, 8 to 10 and 18, the left reinforcing member 35 has first and second bulkheads (left first and second bulkheads) 41 and 42 partitioning the interior of the curved section 28 into front and rear portions. The first bulkhead 41 has a first nut member 38, and the second bulkhead 42 has a second nut member 39. The first and second nut members (left first and second nut members) 38 and 39 each have a female thread formed therein in a vertical direction thereof. The first and second bulkheads 41 and 42 and the first and second nut members 38 and 39 are located between the first recessed portion 31 and the second recessed portion 32.

The bulkheads 41 and 42 and nut members 38 and 39 of the right reinforcing member 35 (i.e., right bulkheads 41 and 42 and right nut members 38 and 39) will not be described here because they are of the same construction as the left bulkheads 41 and 42 and nut members 38 and 39 except that they are disposed in left-right symmetrical relation to the left bulkheads 41 and 42 and nut members 38 and 39.

The left first bulkhead 41 is a vertical plate-shaped member that extends from a front end portion of the left, reinforcing member 35 obliquely forward and inward in the vehicle width direction, and that is joined to the outer wall 16c (FIG. 2) of the left front side frame 16. The first nut member 38 is supported by the outer wall 16c via the first bulkhead 41 but also supported by the inner wall 16b (FIG. 2) of the front side frame 16 via the reinforcing member 35.

The left second bulkhead 42 is a vertical plate-shaped member that extends from a middle part, in the front-rear direction, of the left reinforcing member 35 obliquely rearward and inward in the vehicle width direction, and that is joined to the outer wall 16c of the left front side frame 16. The second nut member 39 is supported by the outer wall 16c via the second bulkhead 42 but also supported by the inner wall 16b via the reinforcing member 35.

The vehicle-traveling power-unit 19 disposed between the straight sections 27 of the left and right front side frames 16 (see FIG. 1) is fastened in place by bolts screwed to the left and right first nut members 38 and left and right second nut members 39. Because the left and right nut members 38 and 39 are fixed firmly to the left and right front side frames 16 via the bulkheads 41 and 42, the vehicle-traveling power-unit 19 of a heavy weight can be supported firmly.

The left and right fragile portions 32 are located rearward, in the front-rear direction of the vehicle body, of the left and right bulkheads 41 and 42.

As shown in FIGS. 1, 2 and 11 to 13, left and right stiffeners 36 are provided within the left and right rear sections 29 of the left and right front side frames 16, i.e. the left and right bent sections 29, respectively. The following describe in detail the left stiffer 36. The right stiffener 36 will not be described here because it is of the same construction as the left stiffer 36 except that it is disposed in left-right symmetric relation to the left stiffer 36.

The left stiffener 36 is a member that reinforces the left bent section 29 in such a manner as to suppress bending of the bent section 29 due to collision force applied from the front of the vehicle body. Also, the left stiffener 36 transmits a lateral collision load to the left outrigger 47 and the left tunnel-side extension 46 when the lateral collision load has acted on the left front side frame 16 from a lateral side of the vehicle body.

Further, as shown in FIGS. 8 to 10, the front end 71 of the left stiffener 36 is located relative to the rear end 69 of the left reinforcing member 35 in such a manner as to allow a load, applied in the front-rear direction of the vehicle body, to be transmitted between the front end 71 and the rear end 69. For example, the front end 71 of the left stiffener 36 is located within such a range where a load is transmittable between the front end 71 and the rear end 69 of the left reinforcing member 35, and it faces the rear end 69 of the left reinforcing member 35; for example, the front end 71 of the left stiffener 36 may be located in proximity to or in contact with the rear end 69 of the left reinforcing member 35. In an alternative, the front end 71 of the left stiffener 36 is joined to the left reinforcing member 35.

Figure 2:
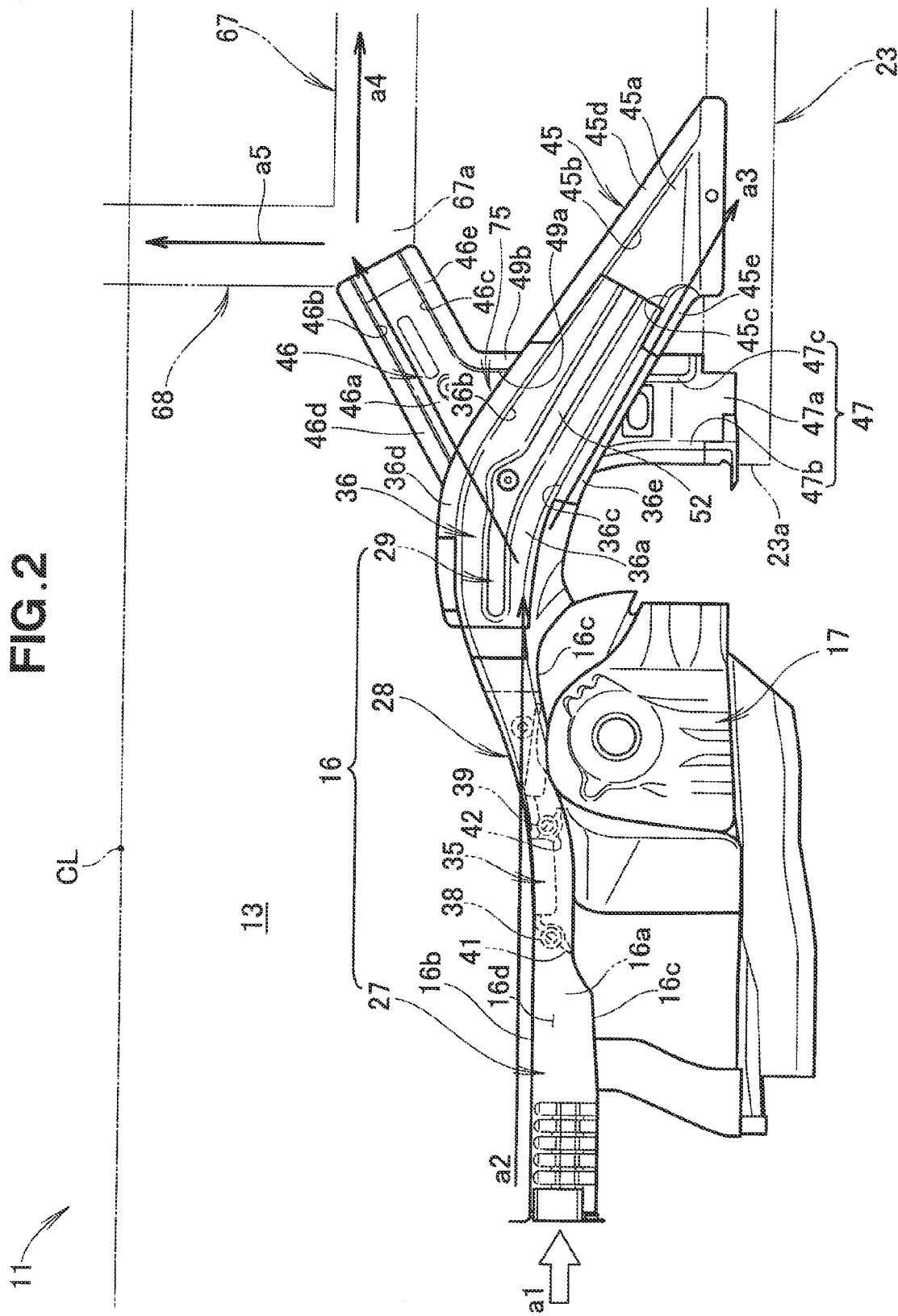
FIG. 2 is a plan view showing a left half of a front section of the vehicle body shown in FIG. 1.
Figure 12:
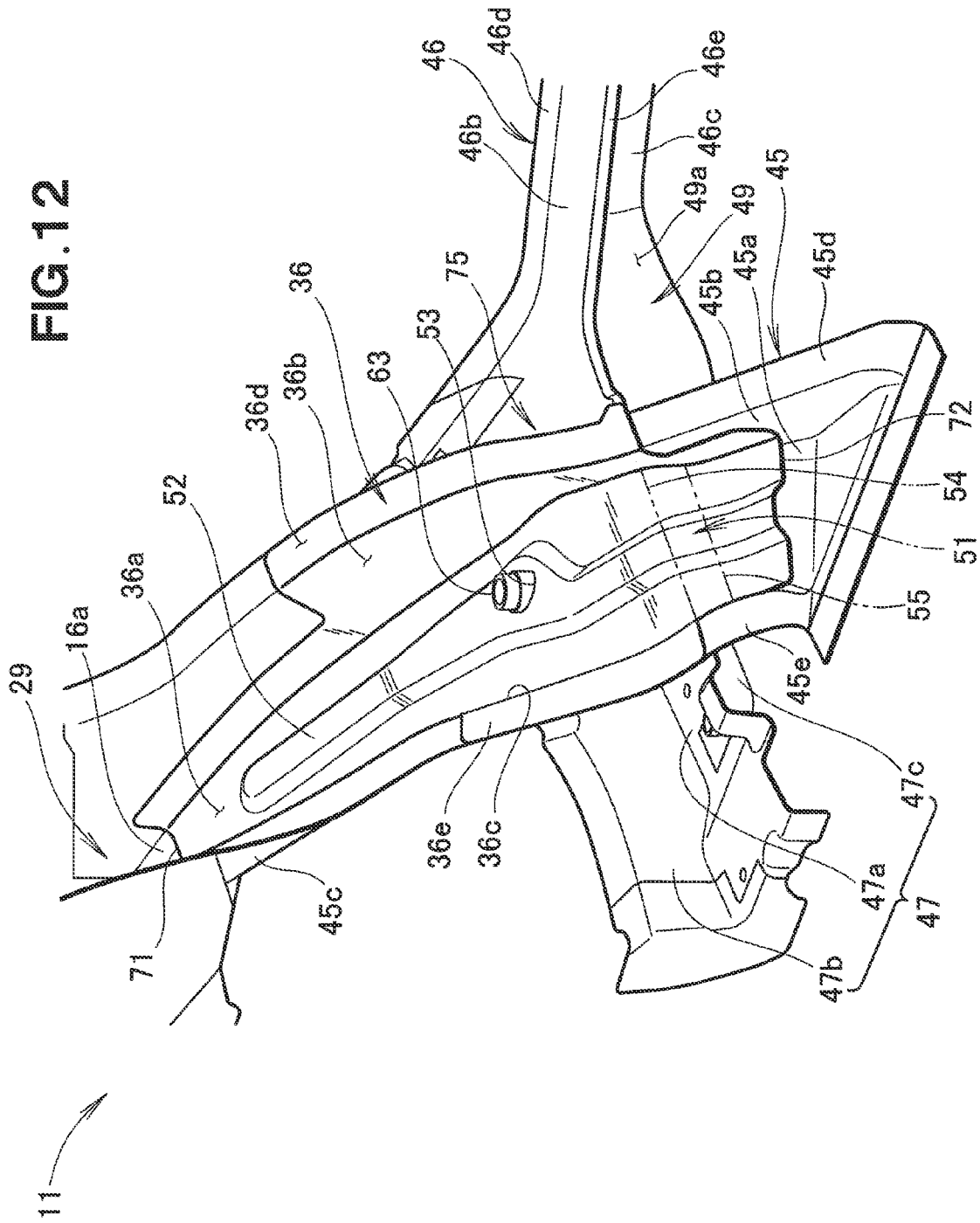
FIG. 12 is a perspective view taken in a direction of arrow 12 of FIG. 11.
Figure 13:
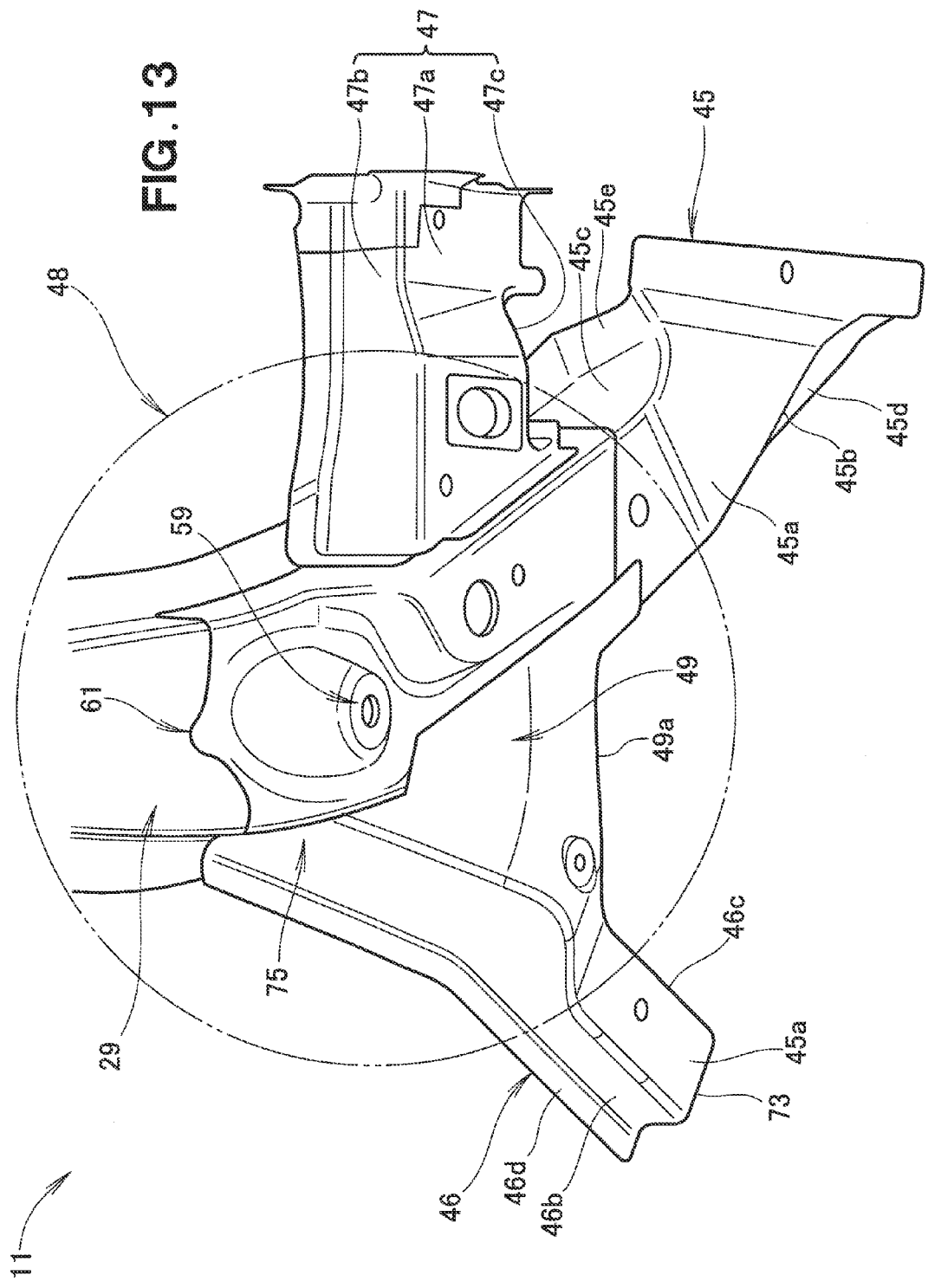
FIG. 13 is a front lower perspective view showing the branch section of FIG. 7 and other sections therearound.
Figure 15:
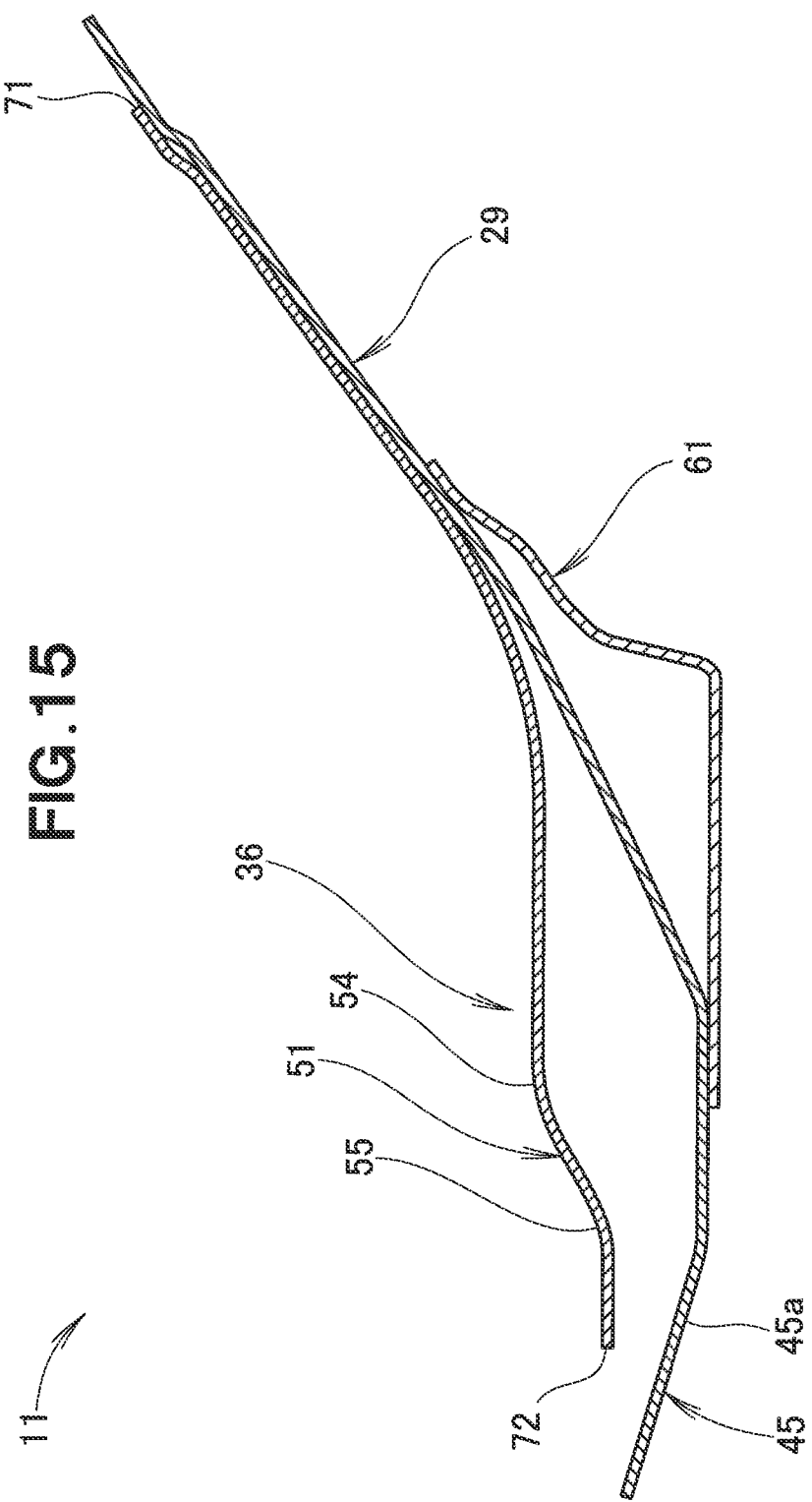
FIG. 15 is a sectional view taken along line 15-15 of FIG. 11.

As shown in FIGS. 2, 11 and 12, the left stiffener 36 is located at an intermediate position, in the front-rear direction, of the left side-sill-side extension 45. Namely, the left stiffener 36 extends from the front end of the left bent section 29, via the left branch section 48, to the left side-sill-side extension 45. Further, as shown in FIGS. 12 and 15, the rear end 72 of the left stiffener 36 is spaced from the bottom plate 45a of the left side-sill-side extension 45 by a predetermined height.

Further, as shown in FIGS. 11 and 12, the left stiffener 36 is a member of an upwardly-opening hat-like sectional shape, and it has: a flat bottom plate 36a; inner and outer plates 36b and 36c projecting upward from the bottom plate 36a; an inner flange 36d bent from the upper end edge of the inner plate 36; and an outer flange 36e bent from the upper end edge of the outer plate 36c.

At the front end 71 of the left stiffener 36, the bottom plate 36a, inner plate 36b and outer plate 36c of the stiffener 36 are jointed (e.g. by spot-welding) to the bottom plate 16a, inner wall 16b and outer wall 16c of the bent section 29. Further, the inner plate 36b and outer plate 36c of the stiffener 36 are superposed, from inside, on the inner plate 45b and outer plate 45c and joined to the inner plate 45b and outer plate 45c. Further, at the rear end 72 of the left stiffener 36, the inner flange 36d and outer flange 36e are joined to the inner and outer flanges 46d and 46e of the left tunnel-side extension 46 via the inner and outer flanges 45d and 45e of the left side-sill-side extension 45.

The bottom plate 36a of the left stiffener 36 has a stepped portion 51 and a bead 52 formed thereon. As shown in FIGS. 12 and 15, the stepped portion 51 is formed by bending the stiffer bottom plate 36a in two stages, i.e. upper and lower stages, in the front-rear direction. The stepped portion 51 has an upper mountain fold line 54 and a lower valley fold line 55, and it extends in the vehicle width direction to be located substantially continuously between the rear plate 47c of the left outrigger 47 and the rear wall 49a of the left load receiving section 49. Thus, collision force applied from a lateral side of the vehicle body can be efficiently transmitted from the left outrigger 47 to the left tunnel-side extension 46 via the stepped portion 51.

The bead 52 is a portion bulging upward from a widthwise middle part of the stiffener bottom plate 36 and extending in a longitudinal direction of the bottom plate 36a, in order to increase the rigidity of the left stiffener 36.

Further, as shown in FIGS. 1, 4 and 5, left and right front end support sections 58 for supporting left and right front end portions 18a of the sub frame 18 by means of left and right fastening members 62 are provided on lower end portions of the left and right front side frames 16, respectively. Left and right rear end support sections 59 supporting left and right rear end portions 18b of the sub frame 18 by means of left and right fastening members 62 are provided on lower end portions of the left and right branch sections 48, respectively. The following describe in detail the left rear end support section 59. The right rear end support section 59 will not be described here because it is of the same construction as the left rear end support section 59 except that it is disposed in left-right symmetric relation to the left rear end support section 59.

Further, as shown in FIGS. 7, 11, 13 and 17, the left rear end support section 59 comprises the left stiffener 36, a left sub frame mount bracket 61 and a left collar nut 63. The left sub frame mount bracket 61 is spaced downward from the stiffener bottom plate 36a by a predetermined distance and, joined to the left bent section 29. The left collar nut 63 is a cylindrical member having a female thread formed vertically in its inner surface, and it is located at an intersection point among the first extension line C1, the second extension line C2 and the third extension line C3. Namely, the left rear end support section 59 is located immediately in front of the left load receiving section 49 having a triangular shape as viewed in plan.

An upper end portion of the left collar nut 63 extends through and is joined to a support hole 53 formed in the bead 52 of the left stiffener 36. A lower end portion of the left collar nut 63 is joined to the left sub frame mount bracket 61. Namely, the left collar nut 63 is joined at its upper and lower portions to the left stiffener 36 and the left sub frame mount bracket 61. The fastening member 62 (FIG. 1) is screwed into the left collar nut 63.

The following describe, with reference to FIGS. 2 and 5, example transmission paths of collision force having acted on the vehicle body 11. When a so-called frontal collision, where collision force acts on the front surface of the vehicle body 11, has occurred, the collision force from the front of the vehicle body (indicated by arrow a1) is transmitted straight from the inner wall 16b of the left front side frame 16 to the outer wall 16c of the left front side frame 16 by way of the left reinforcing member 35 as indicated by arrow a2 and then branches left and right from the left branch section 48 (FIG. 4).

In this case, the front end 71 of the left stiffener 36 is located relative to the rear end 69 of the reinforcing member 35 in such a manner as to allow a load, applied in the front-rear direction of the vehicle body, to be transmitted to and from the rear end 69 of the reinforcing member 35. Thus, the collision force from the front of the vehicle body can be readily transmitted straight from the inner wall 16b of the left front side frame 16 to the outer wall 16c of the left front side frame 16 by way of the left reinforcing member 35.

The collision force having branched from the left branch section 48 outwardly in the vehicle width direction is transmitted to the side sill 23 by way of the left side-sill-side extension 45 and left stiffener 36 as indicated by arrow a3 of FIG. 2. The collision force having branched from the left branch section 48 inwardly in the vehicle width direction, on the other hand, is transmitted not only to the left tunnel frame 67 by way of the left tunnel-side extension 46 as indicated by arrow a4 of FIG. 2 but also to the right side sill 23 and right tunnel frame 67 by way of the tunnel cross member 68 as indicated by arrow a2.

In the aforementioned manner, the collision force from the front of the vehicle body is transmitted from one of the front side frames 16 to one of the side sills 23 and the tunnel section 24 located in the vehicle widthwise middle region and then sufficiently dispersed to a rear section of the vehicle body 11.

Because the left and right side-sill-side extensions 45 are reinforced with the left and right stiffeners 36 (see FIG. 2), they have a great strength and rigidity. The left and right tunnel-side extensions 46, on the other hand, are not reinforced with stiffeners and have a smaller strength and rigidity than the left and right side-sill-side extensions 45. Further, the left and right side sills 23 have a great strength and rigidity. Thus, more of collision force applied from the front of the vehicle body can be received by the high-rigidity left and right side-sill-side extensions 45 and left and right side sills 23. Therefore, the tunnel section 24 does not have to bear much of the collision force from the front of the vehicle body, and thus, it is possible to reduce the size of the left and right tunnel frames 67 or dispense with the left and right tunnel frames 67. As a result, the vehicle body 11 can be reduced in weight.

Further, when a so-called lateral collision, where collision force acts on a lateral side surface of the vehicle, the lateral collision force (arrow b1) is transmitted, for example as indicated by arrow b2, from one of the side sills 23 to the rear wall 47c (see FIG. 2) of the outrigger 47. The collision force having transmitted to the rear wall 47c transmits to one of the tunnel-side extensions 46 as indicated by arrow b3 via the rear wall 49a of the load receiving section 49 (FIG. 11). The collision force having transmitted to the tunnel-side extension 46 passes through the tunnel cross member 68 as indicated by arrow b4 and then transmits from the other tunnel-side extension 46 to the other side sill 23 by way of the load receiving section 49 and outrigger 47 as indicated by arrow b5. At that time, the collision force having transmitted to the other load receiving section 49 transmits to the other side sill 23 by way of the side-sill-side extension 45 as indicated by arrow b6.

Thus, the lateral collision force can be sufficiently dispersed in the vehicle width direction by transmitting from one of the side sills 23, the tunnel section 24 provided on the vehicle widthwise middle region and the other side sill 23.

The foregoing description may be summarized as follows. Although longitudinally middle parts of the left and right front side frames 16 extend toward the rear of the vehicle body while curving from outside to inside in the vehicle width direction, the left and right reinforcing members 35 are provided within the curved sections 28. The left and right reinforcing members 35 each extend substantially straight in the front-rear direction of the vehicle body from a portion, in front of the left or right curved section 28, of the inner wall 16b of the left or right front side frame 16 to a portion, behind the left or right curved section 28, of the outer wall 16c of the left or right front side frame 16.

Thus, when a frontal collision of the vehicle 10 has occurred, the frontal collision force transmits from the front ends of the left and right front side frames 16 to the rear ends of the left and right front side frames 16 by way of the left and right curved sections 28. At that time, the collision force applied from the front of the vehicle body also transmits from portions, in front of the left and right curved sections 28, of the inner walls 16b to portions, behind the left and right curved sections 28, of the outer walls 16c of the left and right front side frames 16 via the substantially straight left and right reinforcing members 35. Namely, the collision force from the front of the vehicle body can be efficiently transmitted from the front ends to the rear ends of the left and right front side frames 16 via the substantially straight left and right reinforcing members 35 extending in the front-rear direction through the curved sections.

Further, because the rear half portions of the left and right front side frames 16 extend toward the rear of the vehicle body while curving from outside to inside in the vehicle width direction, a space between the front half portions of the left and right front side frames 16 is greater in width than a space between the rear half portions of the left and right front side frames 16. Thus, even where the overall length of each of the left and right front side frames 16 is short, the vehicle-traveling power unit 19 (comprising, for example, a transverse-mounted engine and a transmission) can be disposed in a laterally-long orientation in the greater space between the front half portions of the left and right front side frames 16. Further, if left and right front wheels are disposed outward, in the vehicle width direction, of the rear half portions of the left and right front side frames 16 that define the smaller space therebetween, respective steerable ranges of the left and right front wheels can be increased.

Further, because the left side-sill-side extension 45 and left tunnel-side extension 46 and the right side-sill-side extension 45 and right tunnel-side extension 46 branch in the vehicle width direction from the respective bent section, extending integrally from the rear ends of the left and right front side frames 16, at equal or substantially equal angles θ1 and θ2 with respect to the bent sections. Thus, collision force applied from the front of the vehicle body can be efficiently dispersed by being transmitted from the rear ends of the left and right front side frames 16 to the curved sections, then from the curved sections to both the left and right side-sill-side extensions 45 and the left and right tunnel-side extensions 46.

Further, each of the left and right outriggers 47 extends from a portion of the left or right side-sill-side extension 45 opposite from a portion of the left or right side-sill-side extension 45 from which the left or right tunnel-side extension 46 branches. Further, the left and right outriggers 47 extend outward in the vehicle width direction from the outer walls 16c of the bent sections and then are joined to the left and right side sills 23. Thus, when a so-called lateral collision, where collision force acts on a lateral side surface of the vehicle, has occurred, the lateral collision force transmits from one of the left and right side sills 23 to the tunnel section 24 located in the vehicle widthwise middle region of the vehicle body via the outrigger 47, bent section and tunnel-side extension 46 and then transmits from the tunnel section 24 to the vehicle widthwise middle region. Namely, although the left and right side-sill-side extensions 45 extend to the left and right side sills 23 while greatly slanting from the left and right bent sections rearwardly and outwardly in the vehicle width direction, the lateral collision force can be efficiently dispersed from one of the left and right side sills 23 to the vehicle widthwise middle region.

Further, the left and, right reinforcing members 35 include the left and right bulkheads 41 and 42 disposed for partitioning the interior of the left and right curved sections 28 into front and rear interior portions. The left and right bulkheads 41 and 42 include the left and right nut members 38 and 39 for supporting the vehicle-traveling power unit 19 disposed between the left and right, front side frames 16. Thus, when a collision force has transmitted from the front of the vehicle body to the vehicle-traveling power unit 19, it transmits from the vehicle-traveling power unit 19 to the left and right front side frames 16 by way of the left and right nut members 38 and 39, left and right bulkheads 41 and 42 and left and right reinforcing members 35. In this way the frontal collision force can be efficiently transmitted from the vehicle-traveling power unit 19 to the left and right front side frames 16 for effective dispersion.

Further, the rear sections of the left and right front side frames 16 are bent to extend along the underside of the lower dashboard panel 21. Because the thus-bent rear sections of the left, and right front side frames 16 are reinforced with the left and right stiffeners 36 provided therein, bending of the bent rear sections due to external force can be suppressed.

Further, the front ends 71 of the left and right stiffeners 36 are located relative to the rear ends 69 of the left and right reinforcing members 35, disposed in the sections curved inward, in the vehicle width direction, in such a manner as to allow a load, applied in the front-rear direction of the vehicle body, to be transmitted to and from the rear ends 69 of the left and right reinforcing members 35. Thus, collision force from the front of the vehicle body can be transmitted promptly and efficiently to the left and right stiffeners 36 via the left and right reinforcing members 35. Thus, although the left and right front side frames 16 curve inward in the vehicle width direction and bend obliquely rearward and downward, collision force from the front of the vehicle body can be efficiently transmitted from the front ends to the rear ends of the left and right front side frames 16. Thus, the collision force from the front of the vehicle body can be efficiently dispersed from the front ends of the left and right front side frames 16 toward the rear of the vehicle body.

Further, each of the left and right reinforcing members 35 is formed in a U sectional shape, and the bead 65 extending in the front-rear direction of the vehicle body is formed on the bottom wall 64, defining the bottom of the U section, of each of the left and right reinforcing members 35. Thus, the left and right reinforcing members 35 can have an increased strength and rigidity in the front-rear direction of the vehicle body. Thus, collision force from the front of the vehicle body can be efficiently dispersed from the front ends of the left and right front side frames 16 to the rear ends of the left and right front side frames 16.

Furthermore, the tunnel section 24 includes the center tunnel 66, the tunnel frames 67 provided on the left and right sides of the center tunnel 66 and the tunnel cross member 68. The tunnel cross member 68 connects at least either between the front ends 67a of the left and right tunnel frames 67 or between the rear ends 73 of the left and right tunnel-side extensions 46. Thus, a load having transmitted from the tunnel-side extension 46, located on one of the widthwise sides of the vehicle body 11, to the tunnel section 24 can be dispersed efficiently to the other widthwise side of the vehicle body 11 via the tunnel cross member 68.

Further, the left and right fragile portions 32 are provided in the inner walls 16 of the respective curved sections 28 of the left and right front side frames 16. The left and right fragile portions 32 are more fragile against a load applied in the front-rear direction of the vehicle body than the other portions in the left and right front side frames 16. Further, the left and right fragile portions 32 are located rearward, in the front-rear direction of the vehicle body of the left, and right bulkheads 41 and 42 partitioning the interior of the curved sections 28 into front and rear interior portions. The left and right bulkheads 41 and 42 include the left and right nut members 38 and 39 for supporting the vehicle-traveling power unit 19 disposed between the left and right front side frames 16.

Thus, when collision force has transmitted from the front of the vehicle body to the vehicle-traveling power unit 19, the collision force transmits from the vehicle-traveling power unit 19 to the left and right front side frames 16 via the left and right nut members 38 and 39 and the left and right bulkheads 41 and 42. The left and right fragile portions 32 provided in the inner walls 16b of the left and right front side frames 16 can collapse due to the collision force from the front of the vehicle body, as a consequence of which the left and right front side frames 16 are bent outward in the vehicle width direction. The provision of such left and right fragile portions can achieve an enhanced collision energy absorbing performance of the front section of the vehicle body.

Furthermore, the left and right fragile portions 32 are in the form of left and right recessed portions of a simple construction each formed by being merely dented toward the interior of the closed section of the left or right curved section 28. The left and right fragile portions 32 are located in portions of a small width, i.e. small sectional area, of the left and right curved sections 28. Thus, the left and right fragile portions 32 can promote bending of the left and right front side frames 16 due to collision force from the front of the vehicle body.

Further, each of the left and right reinforcing members 35, formed in a U sectional shape, has the partly-omitted sectional portion 81. Such a partly-omitted sectional portion 81 has a lower strength and rigidity than the other portions of the corresponding, i.e. left or right, reinforcing member 35. The left and right fragile portions 32 are opposed to the partly-omitted sectional portions 81. Thus, bending of the left and right front side frames 16 due to collision force from the front of the vehicle body can be even further promoted.

INDUSTRIAL APPLICABILITY

The front vehicle body structure of the present invention is well suited for application to passenger vehicles, such as sedans and wagons, and particularly small-size vehicles.

LEGEND

10 . . . vehicle, 11 . . . vehicle body, 16 . . . front side frame, 16b . . . inner wall located inward, in vehicle width direction, of curved section, 16b . . . outer wall located outward, in vehicle width direction, of curved section, 19 . . . vehicle-traveling power unit, 21 . . . lower dashboard panel, 22 . . . floor panel, 23 . . . side sill, 24 . . . tunnel section, 28 . . . curved section, 29 . . . rear section of front side frame, 32 . . . fragile portion (recessed portion), 35 . . . reinforcing member, 36 . . . stiffener, 38, 39 . . . nut member, 41, 42 . . . bulkhead, 45 side-sill-side extension, 46 . . . tunnel-side extension, 48 . . . branch section, 64 . . . , bottom wall, 65 . . . bead, 66 . . . center tunnel, 67 . . . tunnel frame, 67a . . . front end of tunnel frame, 68 . . . tunnel cross member, 73 . . . rear end of tunnel-side extension, 81 . . . partly-omitted sectional portion, Pw . . . small-width part, Wd . . . width, θ1 . . . angle at which side-sill-side extension slants outward in vehicle width direction, θ2 . . . angle at which tunnel-side extension slants inward in vehicle width direction,

The invention claimed is:

1. A front vehicle body structure comprising: left and right front side frames disposed on left and right sides of a front section of the vehicle body and extending in a front-rear direction of the vehicle body; a lower dashboard panel disposed behind the left and right front side frames and partitioning the vehicle body into front and rear sections; a floor panel extending rearward from a lower portion of the lower dashboard panel; a tunnel section disposed on a middle region, in a vehicle width direction, of the floor panel and extending in the front-rear direction of the vehicle body; and left and right side sills disposed on opposite sides, in the vehicle width direction, of the floor panel and extending in the front-rear direction of the vehicle body, wherein:
the left and right front side frames are each formed in a closed sectional shape and have, in rear half portions thereof, left and right curved sections, respectively, extending rearward while curving from outside to inside in the vehicle width direction,
left and right reinforcing members are provided within the left and right curved sections, respectively, each of the left and right reinforcing members extending in the front-rear direction of the vehicle body from a portion, at the front of the left or right curved section, of an inner wall located inward in the vehicle width direction, of the left or right front side frame to a portion, at the rear of the left or right curved section, of an outer wall, located outward in the vehicle width direction, of the left or right front side frame, the front vehicle body structure further comprises: left and right side-sill-side extensions bent rearward and outward in the vehicle width direction from rear ends of the left and right front side frames, respectively, continuously with the closed sections of the left and right front side frames, the left and right side-sill-side extensions being bent from the rear ends of the left and right front side frames rearwardly and outwardly in the vehicle width direction to slantingly extend rearward and outward in the vehicle width direction to be joined the left and right side sills, respectively; and left and right tunnel-side extensions branching from inner walls, located inward in the vehicle width direction, of the bent portions of the left and right side-sill-side extensions and slantingly extending rearward and inward in the vehicle width direction to be joined to the tunnel section, and an angle at which each of the left and right tunnel-side extensions slants inward in the vehicle width direction is set substantially equal to an angle at which each of the left and right side-sill-side extensions slants outward in the vehicle width direction.

2. The front vehicle body structure according to claim 1, further comprising left and right outriggers that extend outward in the vehicle width direction from outer walls, located outward in the vehicle width direction, of front end portions of the left and right side-sill-side extensions, respectively, and that are joined to the left and right side sills, respectively.

3. The front vehicle body structure according to claim 1, wherein the left and right reinforcing members include left and right bulkheads, respectively, each of the left and right bulkheads partitioning an interior of the left or right curved section into front and rear portions, and the left and right bulkheads have left and right nut members, respectively, for supporting a vehicle-traveling power unit disposed between the left and right front side frames.

4. The front vehicle body structure according to claim 1, wherein a rear section of each of the left and right front side frames is constructed as a bent structure where the rear section is bent rearward and downward along an underside of the lower dashboard panel with a rear lower end portion of the rear section bent rearward, the left and right stiffeners are provided in the bent rear sections of the left and right front side frames, respectively, and a front end of each of the left and right stiffeners is located relative to a rear end of a corresponding one of the left and right reinforcing members in such a manner that a load applied in the front-rear direction of the vehicle body can be transmitted between the front end of the stiffener and the rear end of the reinforcing member.

5. The front vehicle body structure according to claim 1, wherein each of the left and right reinforcing members is formed in a U sectional shape, and a bead is formed on a bottom wall, defining a bottom of the U section, of each of the left and right reinforcing members.

6. The front vehicle body structure according to claim 1, wherein the tunnel section includes:
a center tunnel protruding upward from a central part, in the vehicle width direction, of the floor panel and extending in the front-rear direction of the vehicle body;

left and right tunnel frames provided on opposite sides, in the vehicle width direction, of the center tunnel; and a tunnel cross member connecting at least either between front ends of the left and right tunnel frames or between rear ends of the left and right tunnel-side extensions.

7. The front vehicle body structure according to claim 3, wherein the inner walls, located inward in the vehicle width direction, of the left and right curved sections have left and right fragile portions, respectively, and the left and right fragile portions are more fragile than other portions of the left and right front side frames, and wherein the left and right fragile portions are located more rearward, in the front-rear direction of the vehicle body, than the left and right bulkheads.

8. The front vehicle body structure according to claim 7, wherein the left and right fragile portions are in a form of left and right recessed portions each dented from the inner wall of the left or right curved section toward the interior of the closed section of the left or right curved section, and the left and right recessed portions are each located in a portion of the left or right curved section having a smaller width than other portions of the left or right curved section.

9. The front vehicle body structure according to claim 7, wherein the left and right reinforcing members are each formed in a U sectional shape and each have a partly-omitted sectional portion with a part of the U sectional shape taken away, and wherein the left and right fragile portions are disposed in opposed relation to the partly-omitted sectional portions of the left and right reinforcing members.

10. The front vehicle body structure according to claim 2, wherein the left and right reinforcing members include left and right bulkheads, respectively, each of the left and right bulkheads partitioning an interior of the left or right curved section into front and rear portions, and the left and right bulkheads have left and right nut members, respectively, for supporting a vehicle-traveling power unit disposed between the left and right front side frames.

11. The front vehicle body structure according to claim 2, wherein a rear section of each of the left and right front side frames is constructed as a bent structure where the rear section is bent rearward and downward along an underside of the lower dashboard panel with a rear lower end portion of the rear section bent rearward, the left and right stiffeners are provided in the bent rear sections of the left and right front side frames, respectively, and a front end of each of the left and right stiffeners is located relative to a rear end of a corresponding one of the left and right reinforcing members in such a manner that a load applied in the front-rear direction of the vehicle body can be transmitted between the front end of the stiffener and the rear end of the reinforcing member.

12. The front vehicle body structure according to claim 3, wherein a rear section of each of the left and right front side frames is constructed as a bent structure where the rear section is bent rearward and downward along an underside of the lower dashboard panel with a rear lower end portion of the rear section bent rearward, the left and right stiffeners are provided in the bent rear sections of the left and right front side frames, respectively, and a front end of each of the left and right stiffeners is located relative to a rear end of a corresponding one of the left and right reinforcing members in such a manner that a load applied in the front-rear direction of the vehicle body can be transmitted between the front end of the stiffener and the rear end of the reinforcing member.

13. The front vehicle body structure according to claim 2, wherein each of the left and right reinforcing members is formed in a U sectional shape, and a bead is formed on a bottom wall, defining a bottom of the U section, of each of the left and right reinforcing members.

14. The front vehicle body structure according to claim 2, wherein the tunnel section includes:

a center tunnel protruding upward from a central part, in the vehicle width direction, of the floor panel and extending in the front-rear direction of the vehicle body;

left and right tunnel frames provided on opposite sides, in the vehicle width direction, of the center tunnel; and a tunnel cross member connecting at least either between front ends of the left and right tunnel frames or between rear ends of the left and right tunnel-side extensions.

15. The front vehicle body structure according to claim 3, wherein each of the left and right reinforcing members is formed in a U sectional shape, and a bead is formed on a bottom wall, defining a bottom of the U section, of each of the left and right reinforcing members.

16. The front vehicle body structure according to claim 3, wherein the tunnel section includes:

a center tunnel protruding upward from a central part, in the vehicle width direction, of the floor panel and extending in the front-rear direction of the vehicle body;

left and right tunnel frames provided on opposite sides, in the vehicle width direction, of the center tunnel; and a tunnel cross member connecting at least either between front ends of the left and right tunnel frames or between rear ends of the left and right tunnel-side extensions.

17. The front vehicle body structure according to claim 4, wherein each of the left and right reinforcing members is formed in a U sectional shape, and a bead is formed on a bottom wall, defining a bottom of the U section, of each of the left and right reinforcing members.

18. The front vehicle body structure according to claim 4, wherein the tunnel section includes:

a center tunnel protruding upward from a central part, in the vehicle width direction, of the floor panel and extending in the front-rear direction of the vehicle body;

left and right tunnel frames provided on opposite sides, in the vehicle width direction, of the center tunnel; and a tunnel cross member connecting at least either between front ends of the left and right tunnel frames or between rear ends of the left and right tunnel-side extensions.

19. The front vehicle body structure according to claim 5, wherein the tunnel section includes:

a center tunnel protruding upward from a central part, in the vehicle width direction, of the floor panel and extending in the front-rear direction of the vehicle body;

left and right tunnel frames provided on opposite sides, in the vehicle width direction, of the center tunnel; and a tunnel cross member connecting at least either between front ends of the left and right tunnel frames or between rear ends of the left and right tunnel-side extensions.

* * * * *